United States Patent

Teder

Patent Number: 5,700,204
Date of Patent: Dec. 23, 1997

[54] PROJECTILE MOTION PARAMETER DETERMINATION DEVICE USING SUCCESSIVE APPROXIMATION AND HIGH MEASUREMENT ANGLE SPEED SENSOR

[76] Inventor: Rein S. Teder, 9401 Xylon Ave. S., Bloomington, Minn. 55438

[21] Appl. No.: 668,431

[22] Filed: Jun. 17, 1996

[51] Int. Cl.⁶ .................................................. A63B 69/36
[52] U.S. Cl. ........................................ 473/199; 473/407
[58] Field of Search ............................. 473/198, 199, 473/200, 407, 131; 364/460, 560, 561, 562; 342/42, 104, 125

[56] References Cited

U.S. PATENT DOCUMENTS

| | | | |
|---|---|---|---|
| 2,003,074 | 6/1935 | Gage . | |
| 4,052,722 | 10/1977 | Millard | 343/8 |
| 4,063,259 | 12/1977 | Lynch et al. | 354/120 |
| 4,180,726 | 12/1979 | DeCrescent | 250/222 R |
| 4,276,548 | 6/1981 | Lutz | 343/7 PL |
| 4,545,576 | 10/1985 | Harris | 273/25 |
| 4,673,183 | 6/1987 | Trahan | 273/176 A |
| 4,858,922 | 8/1989 | Santavaci | 273/26 R |
| 4,971,325 | 11/1990 | Lipps | 273/183 B |
| 5,062,641 | 11/1991 | Poillon et al. | 273/181 C |
| 5,082,263 | 1/1992 | Berger | 273/29 R |
| 5,092,602 | 3/1992 | Witler et al. | 273/184 R |
| 5,160,839 | 11/1992 | Nishiyama et al. | 250/222.1 |
| 5,209,483 | 5/1993 | Gedney et al. | 273/187.4 |
| 5,246,232 | 9/1993 | Eccher et al. | 273/184 R |
| 5,290,037 | 3/1994 | Witler et al. | 273/184 R |
| 5,298,904 | 3/1994 | Olich | 342/42 |
| 5,342,051 | 8/1994 | Rankin et al. | 273/185 A |
| 5,375,832 | 12/1994 | Witler et al. | 273/184 R |
| 5,393,064 | 2/1995 | Beard, III et al. | 273/181 R |
| 5,401,026 | 3/1995 | Eccher et al. | 273/184 R |
| 5,434,789 | 7/1995 | Fraker et al. | 364/460 |
| 5,437,457 | 8/1995 | Churchod | 273/185 A |
| 5,438,518 | 8/1995 | Bianco et al. | 364/460 |
| 5,471,383 | 11/1995 | Gobush et al. | 364/410 |
| 5,479,008 | 12/1995 | Nishiyama et al. | 250/222.1 |
| 5,481,355 | 1/1996 | Iijiama et al. | 356/28 |
| 5,486,002 | 1/1996 | Witler et al. | 273/184 R |
| 5,507,485 | 4/1996 | Fisher | 473/407 |

OTHER PUBLICATIONS

*Golf Ball Aerodynamics*, by Bearman, P.W. and Harvey, J.K. in Aeronautical Quarterly, 27 pp. 112–122, Date: 1976.

*Primary Examiner*—George Manuel

[57] ABSTRACT

The invention relates to an apparatus and method for determining parameters of motion regarding a struck projectile. The invention has particular application to determining the launch parameters of a golf ball struck by a golf club. A Doppler microwave speed sensor measures the apparent speed of a struck golf ball, which is the true speed of the ball subtended onto a radial from the sensor to the ball. The speed sensor is positioned a substantial lateral distance from a straight aim line, and the sensor's microwave beam is wide. As a result of this deployment, and in contrast to the typical usage of microwave speed sensors, the apparent speed measured by the sensor differs significantly from the true speed of the ball. The measured apparent speed results from a complicated interaction of initial ball speed, loft angle, and aim angle. A computer connected to the sensor acquires measured apparent speed data into an array. Within the computer, a trajectory prediction algorithm is capable of predicting an array of apparent speeds which would result from a given set of launch conditions. An error function is capable of ascertaining how well predicted apparent speeds match actual acquired speeds. A search algorithm uses the trajectory prediction algorithm and the error function to try a succession of progressively better guesses of launch parameters. Those launch parameters, comprised of initial ball speed, loft angle, and aim angle, which best account for the acquired apparent speed data are reported by the computer as the actual launch parameters. An impact detection device is configured to detect the impact of club on ball within a window of time in which such impact is plausible. The computer will not report launch parameters if a comparison using the error function indicates that the acquired data was likely the result of interference from an extraneous golf ball.

31 Claims, 10 Drawing Sheets

TYPICAL ACQUIRED DATA

FLOW CHART OF TRAJECTORY ALGORITHM

FLOWCHART OF ERROR FUNCTION

SEARCH ALGORITHM

PROJECTILE MOTION PARAMETER DETERMINATION DEVICE USING SUCCESSIVE APPROXIMATION AND HIGH MEASUREMENT ANGLE SPEED SENSOR

BACKGROUND—FIELD OF INVENTION

The invention relates to an apparatus and method for determining parameters of motion regarding a struck projectile. The invention has particular application to determining the launch parameters of a golf ball struck by a golf club, but is not limited thereto.

BACKGROUND—SUMMARY OF PRIOR ART

Various methods of simulating a game of golf have been proposed for some time. An accurate simulation of a golf game has many virtues, including the ability to play the game in an enclosed space, protected from inclement weather. Also, a simulated golf game might be played more quickly than an actual game, as a golfer need not spend time walking to each location where a struck ball lands. Less real estate is needed, and thus the cost of playing a simulation is likely to be less than that of playing a golf course. A simulation may include some manner of computer controlled video display, providing a level of realism to make the game enjoyable. These and other virtues of simulated golf have long been recognized.

The most difficult aspect of simulating a game of golf has historically been that of accurately discerning the trajectory of a struck golf ball. For example, in 1933 B. E. Gage (U.S. Pat. No. 2,003,074) taught a golf game in which the player noted where the ball landed. This method of parameter determination relies heavily on the judgment of the player, and is not amenable to interfacing to a computer. In 1977 Lynch et al., in U.S. Pat. No. 4,063,259, taught a photographic method for extracting the launch parameters of a struck golf ball. While the method is accurate, it is similarly not amenable to computer interface, and lacks the capacity to extract the aim angle of the struck golf ball.

Gedney et al., in U.S. Pat. No. 5,209,483, have taught that a golf club may be instrumented with a plurality of sensors, permitting the determination of the launch parameters of a struck ball. This method precludes a golfer from using his or her own clubs. Also, the flight of the ball is assumed based on a particular method of play. If the golfer hits the ball later or earlier in the swing, the disclosed invention will yield inaccurate results. Lipps has taught (U.S. Pat. No. 4,971,325) that a simulated club may shine infrared beams at a light detecting sensor, deposed to simulate a golf ball. The sensor is connected to a computer which predicts the launch parameters would have resulted had an actual club struck an actual ball. Such a system lacks the proper feel of a real golf club, and may give results that are much different from those that would have arisen from using a real club and ball.

Known golf simulation devices include instrumented targets that indicate the magnitude and location of impacts of a golf ball. Such a system is taught by Poillon et al. in U.S. Pat. No. 5,062,641. Because the fight of the ball is cut quite short, the golfer is denied the gratification of watching a well struck ball sail a considerable distance. Ideally, a simulation would be capable of being deployed outdoors at a driving range. Also, the system of '641 uses a plurality of sound wave detectors, and is thus subject to acoustic interference.

Others have taught that the flight of a struck golf ball may be detected by optical means. A particularly complete example is shown by Iijima et at. in U.S. Pat. No. 5,481,355. A struck golf ball intersects at least two beams of a multi-beam illumination system, and a computer calculates the launch parameters based on a set of forward-based equations derived using consideration of the geometry of the deployment of a sensor. The sensor consists of a large array of light receiving portions, each with associated signal processing and computational circuitry. Many such receiving portions are required to ascertain the flight of the ball with sufficient accuracy, contributing to the expense of the system. Additionally, optical sensors are subject to interference from sunlight and other light sources. The Patent of '355 further discloses a surface velocity sensor that directly measures the surface velocity of the ball in its direction of motion. The sensor includes a laser, beam splitter, and lenses, and uses the Doppler effect at optical frequencies. Such a measurement, however, is possible only within the small area in which two beams intersect.

Trahan taught in U.S. Pat. No. 4,673,183 that an entire fairway may be instrumented with a series of microwave proximity detectors, each configured to detect the motion of a golf ball. Using information from the detectors, a computer determines roughly where the ball lands, and displays a simulation of a golf game on a video screen. The large number of sensors required for the approach of '183 makes the system large and expensive.

Given the aforementioned difficulties of golf ball trajectory determination devices, it would seem reasonable that well-known microwave, or radar, based speed sensing devices would find application in this field. Microwave speed sensors are widely used for such applications as automatic door openers, and are quite inexpensive. Such speed sensors have inherent limitations, however, which have in the past limited their deployment for purposes of simulated golf. Microwave speed sensing devices are based on the well known Doppler effect, and measure that component of the speed of an object which subtends a radial from the object to the sensor. The measurement angle is the angle between the direction of motion of the object and a radial from the sensing device. The apparent speed of a sensed object, as measured by the sensor, is the cosine of the measurement angle times the hue speed of the object. If the measurement angle is large, then the measured or apparent speed can be considerably different than the hue speed of the object. The difference between the true speed of the object and the apparent speed of the object as sensed by the speed sensor is known in the field of microwave speed sensing as cosine error.

If, however, a microwave speed sensor is deployed substantially along the path of a moving object, the cosine error is small. Witler et al. (U.S. Pat. No. 5,092,602) have taught that a microwave speed sensor may be placed along the nominally straight aim line of a shuck golf ball, and made to measure over a narrow cone of radiation, or boresight. So deployed, the sensor measures a component of speed which is to a reasonable approximation parallel to the boresight. This configuration thus minimizes cosine error. As a method of further reducing cosine error, Eccher et at. have taught (U.S. Pat. No. 5,246,232) that a microwave speed sensor may be placed along an extension of the straight aim line, behind the tee. To the knowledge of the present inventor, all prior art of microwave speed sensor based golf motion parameter determination devices has deployed sensors so as to minimize cosine error. By deploying the sensor close to the straight aim line and close to the tee, prior art has also minimized the interaction of the aim angle of a struck ball with the measurement process.

Cosine error may minimized, but not eliminated, by appropriate deployment of a microwave sensor. Both Eccher and Witler have taught that the residual effects of cosine error may be corrected for by empirical means. The amount of cosine error, however, is affected by the geometry of measurement, which is affected by the aim angle and the loft angle of the struck golf ball. Thus, empirical correction of cosine error is limited in accuracy.

Additionally, microwave speed sensors produce a single parameter: apparent speed of a moving object. A realistic simulation of a golf game must also include the aim angle and the loft angle of a struck golf ball. Eccher, in '232, has taught that the slope of apparent speed may be empirically correlated to the loft angle of a struck ball. Eccher does not provide an analysis of the reasons for the slope of the apparent speed data, but this slope most likely changes with aim angle, which interacts with cosine error. This, and the empirical nature of the correlation, likely limits the accuracy of the disclosed loft angle determination process. Further, to the knowledge of the present inventor, no prior art of microwave speed sensor based golf parameter determination devices is capable of discerning the aim angle of a struck golf ball. This shortcoming severely limits the applicability of such devices to the purpose of simulating a game of golf. Players of modern video games have come to expect three dimensional realism, and are likely to expect similar sophistication in simulated golf.

Another shortcoming of the prior art of microwave launch parameter devices is a reliance on empirical means of correlating sensor data to ball trajectory parameters. Presumably, data for such devices is obtained by striking many golf balls with the aid of a skilled reference golfer. It takes a great deal of time to gather the data required for such an approach. Further, an empirical approach presumes heavily on the conditions for taking data, and the style of play of the reference golfer. It would stand to reason that empirical methods of prior art device would be less accurate when those devices are used in conjunction with lesser golfers.

A further difficulty of the prior art of microwave golf parameter determination devices is that they tend to be intolerant of missing data. For example, Witler et at. teach in '602 that pulses from a speed sensor may counted in a period of time. If some pulses are missing in that period, the ensuing correlation to carry distance will be inaccurate. Both Lynch ('259) and Eccher ('232) have disclosed that a microphone may be used to trigger the rest of the parameter determination process. This method is subject to false triggers, and does not fully exploit the potential of impact detection timing information in the parameter determination process.

OBJECTS AND ADVANTAGES

It is a first object of the invention to provide an apparatus and method for extracting the initial speed of a struck golf ball or other projectile, without the method being subject to cosine error. It will be shown that the invention extracts the actual initial speed of the struck golf ball, with the effects of cosine error fully removed. In what appears to be a paradox, the invention achieves the virtual elimination of cosine error by first deploying a speed sensor in a fashion which maximizes, rather than minimizes, cosine error.

A further object of the invention is to provide an apparatus and method for accurately the extracting loft angle of a struck golf ball. The method for doing so does not interact with the aim angle of the ball, and does not rely on empirical data or correction factors.

An additional object of the invention is to provide an accurate method of extracting the aim angle of a struck golf ball. While the prior art of microwave speed sensors sought to minimize the interaction of aim angle with the data generated, it will be seen that the present invention seeks to maximize such interaction. It will be shown that, in so doing, it is possible to extract the value of the aim angle.

A further advantage of the invention is the elimination of the need for empirical correlation of the speed sensor to data gathered from particular golfers under particular conditions. By avoiding such empirical correlations, the invention provides accuracy independent of the style of play of the golfer. The present invention makes no assumptions that the golf ball under test was struck with a perfect swing. Instead, the invention is based on kinematic principles and published aerodynamic information. If a poorly hit golf ball results in a ball trajectory which is undesirable, the present invention will nevertheless accurately report the undesirable launch parameters.

It is a further object of the invention to provide a less expensive golf ball trajectory determination device. It will be seen that the disclosed invention does not require a large array of sensors. Additionally, the invention does not require the use of instrumented clubs or an instrumented target, and may be used outdoors.

It is a further object of the invention to provide a microwave golf ball launch parameter determination device which is immune to false triggers, is tolerant of missing data, and is able to ascertain that the data gathered is from the desired golfer.

It will be seen that the invention achieves the aforementioned objects and advantages, as well as further objects and advantages that will become apparent from the ensuing description and drawings. Many of these advantages are achieved by maximizing, analyzing, and fully exploiting what has traditionally been thought of as a source of error in the prior art: measurement angle.

REFERENCE DESIGNATORS IN DRAWINGS

Figure 1:
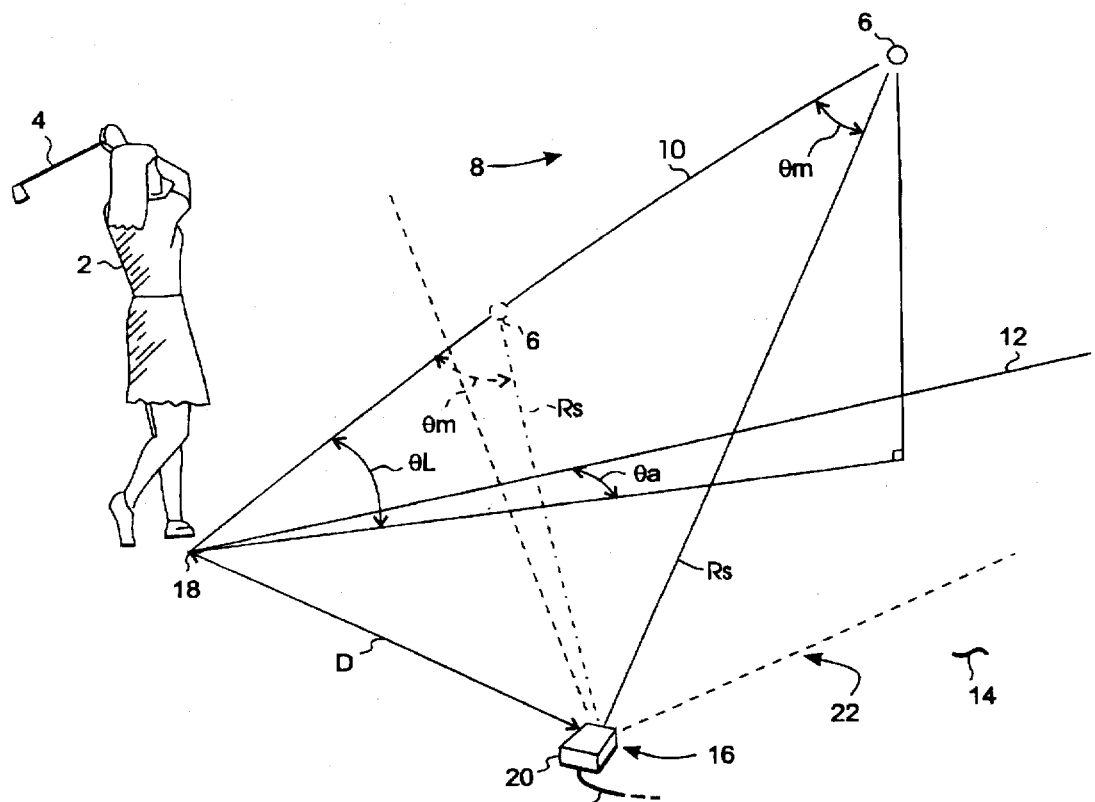
FIG. 1 is a perspective view of the invention in use.

The following is a list of reference designators used in the drawings:

- θL loft angle
- θa aim angle
- D distance of sensor to straight line
- Rs radial from ball to sensor
- θm measurement angle
- Sb speed of ball
- Sx horizontal component of ball speed
- Sy vertical component of ball speed
- Ad acceleration due to drag
- Ag acceleration due to gravity
- AL acceleration due to lift
- θf angle of flight of ball
- X axis of coordinate system (X)
- Y axis of coordinate system (Y)
- Z axis of coordinate system (Z)
- Rt radial from ball to tee
- θm1 measurement angle first sensor
- θm2 measurement angle second sensor
- Rs1 radial to first sensor
- Rs2 radial to second sensor
- B distance into fairway
- 2 golfer
- 4 golf club
- 6 golf ball
- 8 practice region
- 10 trajectory
- 12 straight aim line
- 14 ground surface
- 16 radial speed sensor
- 18 tee-off location
- 19 location of sensor
- 20 housing
- 22 beam of radiation
- 24 curve of true speed
- 26 apparent speed, nominal launch
- 28 start time of acquisition
- 30 time ball is out of range
- 34 apparent speed, faster launch
- 36 apparent speed, slower launch
- 38 apparent speed, higher loft
- 40 apparent speed, lower loft
- 42 apparent speed, positive aim
- 44 apparent speed, negative aim
- 46 microwave transceiver
- 48 horn
- 50 output terminal
- 52 AGC amplifier
- 54 amplifier output terminal
- 56 level sensing output terminal
- 58 computer input for level sensing
- 60 computer
- 62 phase-locked loop (PLL)
- 64 PLL signal output terminal
- 66 computer counter input
- 68 PLL signal quality output
- 70 computer input for PLL quality
- 72 microphone
- 74 amplifier for microphone
- 76 level sensing circuit
- 78 output of level sensing
- 80 A/D in for level sensing
- 81 communications out
- 82 typical speed data
- 84 missing data point -continued

- 86 start of trajectory algorithm
- 88 flight loop
- 90 trajectory calculations
- 92 measured speed calculations
- 94 ball landed decision
- 96 trajectory done block
- 98 carry distance
- 100 bounce trajectory
- 102 start of error function
- 104 error function initialization
- 106 run trajectory algorithm call
- 108 error loop
- 110 data available decision
- 112 add to error value
- 114 increment index
- 116 more data decision
- 118 error function done
- 120 start of search algorithm
- 122 generate initial guess
- 124 preliminary run of error function
- 126 set first best error
- 128 search loop
- 130 decision: tried all guesses?
- 132 generate next guess
- 134 loop run of error function
- 136 decision: guess better?
- 138 assert new best guess
- 139 ERROR threshold decision
- 140 search done successful
- 141 search unsuccessful
- 142 first acoustic level data
- 144 second acoustic level data
- 146 third acoustic level data
- 148 first three speed data points
- 150 extrapolation
- 152 nominal impact time
- 154 upper impact window limit
- 156 lower impact window limit
- 158 actual impact time
- 160 wire to video display unit
- 162 initial guess predicted speed
- 164 second guess
- 166 third guess
- 168 fourth guess
- 170 fifth guess
- 171 speed predicted by search algorithm
- 172 data from wrong golfer
- 174 best fit to wrong golfer
- 176 first of multi-sensors
- 178 second of multi-sensors
- 180 first wide beam of radiation
- 182 second wide beam of radiation
- 184 apparent speed from first sensor
- 186 apparent speed from second sensor

SUMMARY OF THE INVENTION

The invention is preferably deployed at a driving range or other practice space, where a golfer strikes a golf ball with a golf club. A wide beam Doppler microwave radial speed sensor measures the apparent speed of the golf ball, which is the true speed subtended onto a radial from the sensor to the ball. The radial from the sensor to the ball forms a measurement angle with the trajectory of the projectile, and the apparent speed of the ball is the true speed multiplied by the cosine of the measurement angle. The speed sensor is located a substantial lateral distance from a line straight into the driving range. This deployment of the sensor maximizes, rather than minimizes, measurement angle. As a result, the apparent speed of the ball, as measured by the sensor, is a complicated function of initial speed, loft angle, aim angle, and time. An amplifier and Phase-Locked-Loop convert the signal from the transducer into a frequency proportional to the apparent speed of the ball. Software and memory locations within a computer are disposed to measure this frequency and acquire a succession of apparent speeds into a data array.

Each possible combination of launch parameters (comprised of initial speed, loft angle, and aim angle) results in a uniquely different apparent speed array. In principle then, it should be possible to determine what values of launch parameters gave rise to an acquired array of apparent speeds. Within the computer, a trajectory prediction algorithm is capable of predicting an array of apparent speeds which would result from a given set of launch conditions. Also within the computer, an error function is capable of ascertaining how well predicted apparent speeds match actual acquired speeds. A search algorithm uses the trajectory prediction algorithm and the error function to try a succession of guesses of launch parameters, ascertaining how well each guess accounts for the actual acquired speeds. The guess of launch parameters which best accounts for the actual data must therefore closely match the actual launch parameters. Thus, the best guess of launch parameters are reported by the computer to be the extracted launch parameters.

As a method of preventing potential interference from nearby golfers, the computer uses the apparent speed data to determine a window of time within which the impact of the club on the ball is plausible. The computer uses an impact sensing device to search for impacts only within that window. Also, if speed data is erroneously acquired from a nearby golfer who is not using the invention, the successive approximation method will be unable to find predicted trajectory which properly accounts for the acquired speed data. In such case, the computer rejects the launch parameters because the error function determines that the solution is unacceptably poor.

The computer is preferably connected to video display unit located near the golfer. The video unit displays a three dimensional simulation of a golf course, and uses the launch parameters extracted by the invention to simulate a game of golf.

An alternative embodiment of the invention uses multiple speed sensors. In the alternative embodiment, the search algorithm determines the set of launch parameters that best account for the speed data acquired from of all of the speed sensors. This results in a more highly constrained, and thus more accurate, solution.

DETAILED DESCRIPTION OF THE INVENTION

FIG. 1 shows the present microwave launch parameter determination invention in use. A golfer 2 uses a golf club 4 to strike a golf ball 6 along a trajectory 10 into a practice area or region, shown generally at 8. Practice region 8 may be a driving range, large enclosed space, golf course, or other suitable location.. A conceptual straight aim line of practice region 8 is shown as a line 12 on a ground surface 14, representing the direction that golfer 2 would normally consider to be straight. Straight aim line 12 need not have any physical representation in practice region 8. Ball 6 is launched at a loft angle $\theta L$ with respect to ground 14, and at an aim angle $\theta a$, where $\theta a$ is considered positive if ball 6 goes to the right of straight aim line 12.

In the present invention a radial speed sensor, shown generally at 16, is deployed a lateral distance D from straight aim line 12. In the figure, and in equations of ensuing figures, sensor 16 assumed to be laterally in line with a tee-off location 18 as shown. This deployment is not mandatory, and the invention may be modified to accommodate alternative deployments of sensor. The sensor must, however, be deployed a sufficient lateral distance D from the straight aim line, or from an extension of straight aim line 12 behind tee-off location 18. When ball 6 is in flight along trajectory 10, radial speed sensor 16 will detect that component of speed which subtends a radial Rs from sensor 16 to ball 6. Thus, the sensed speed will be the true speed of the ball, multiplied by the cosine of a measurement angle $\theta m$ between radial Rs and trajectory 10. The sensor is preferably a Doppler microwave device contained within a housing 20, and will be described later.

This multiplication by the cosine of measurement angle $\theta m$ causes the apparent, or measured, speed of the ball to be lower than the true speed of the ball. In the field of microwave Doppler radial speed sensing devices, this difference is typically considered an error. Normally, such speed sensing devices are deployed in such a way as to minimize cosine error. In the present invention, however, the sensor is deployed so as to maximize measurement angle $\theta m$, and thereby maximize the difference between true and apparent speeds of the ball. To that end, sensor 16 is configured to produces a wide beam of radiation 22 and is deployed a substantial lateral distance D from the straight path. Ball 6 is illustrated in FIG. 1 twice: first as a dashed line, showing a large measurement angle $\theta m$, and again later in the flight as a solid line, showing a smaller measurement angle $\theta m$. Sensor 16 gathers data as measurement angle $\theta m$ is changing rapidly.

Figure 2:
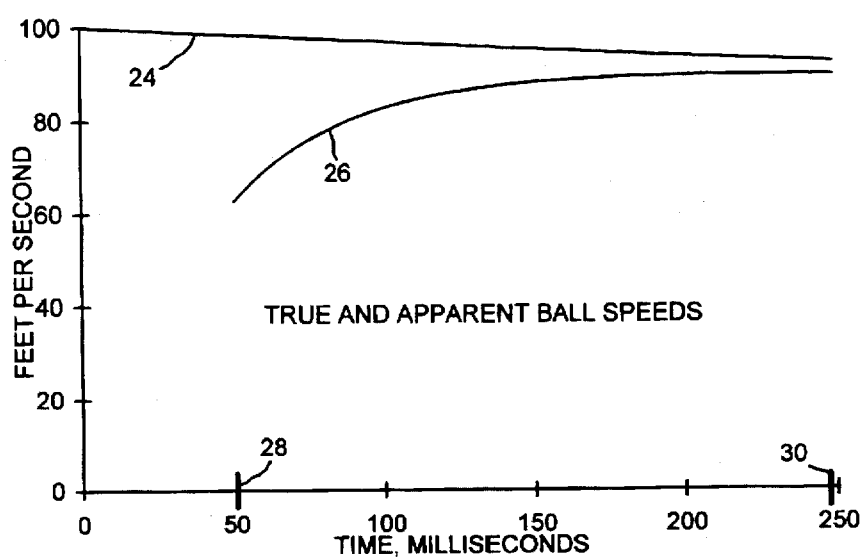
FIG. 2 is a graph of true ball speed and apparent ball speed sensed by the invention.

A typical true speed of the struck golf ball is graphed as a curve 24 against time in FIG. 2. The corresponding apparent speed is plotted as a curve 26 on the same figure. This figure was generated assuming an initial speed of the ball of 100 feet per second (fps,) loft angle $\theta L$ of 20 degrees, and with the ball aimed straight ($\theta a=0$). Sensor 16 is deployed six feet from straight line 12 (i.e. D=6.) Referring to the figure, the true speed of the ball begins to decrease immediately after the ball is in flight, as the ball is decelerated by aerodynamic drag and the force of gravity. Several feet and a few tens of milliseconds into the flight at time 28, the sensor begins to sense the speed of the struck ball. At the beginning of speed acquisition, however, measurement angle Om is quite large. Thus, the apparent speed of the ball is, in this example, only about 65% of the true speed of the ball.

As ball 6 continues along trajectory 10, measurement angle $\theta m$ decreases. Thus, the apparent speed of the ball becomes a larger fraction of the true speed of the ball. For most of the graph, from the start of the acquisition 28 through a time equal to about 220 milliseconds, the apparent speed of the ball is increasing, where the actual speed of the ball is decreasing. Later in the flight, after about 220 milliseconds, radial Rs from the sensor becomes more closely in line with flight trajectory 10, reducing measurement angle Om, and thus the cosine error. Late in the flight, the apparent speed is within a few percent of true speed. The invention makes no distinction between the regions where the apparent speed data is substantially proportional to the true ball speed, and the regions where it is not. At time 30, the ball flies out of range of the speed sensor, and acquisition of the apparent ball speed data ceases.

Examination of FIG. 1 shows that the speed data will be a function of initial ball speed, aim angle $\theta a$, loft angle $\theta L$, and time. Understanding, and thereafter exploiting, the nature of this function is fundamental to the present invention. To this end, the effects of changing the initial speed of the ball are graphed in FIG. 3A. The apparent speed data arising from nominal launch conditions of 100 fps speed, 20 degree loft $\theta L$, and straight aim plotted against time at 26. A curve at 34 shows the effects of increasing the initial speed of the ball, and holding the loft angle θL and aim angle θa constant. Curve 34, corresponding to faster speed, is not just a simple scaling of nominal curve 26. This is because the aerodynamic drag and lift acting on the ball are each functions of speed, and because gravity is acting on the ball as well. These factors affect the deceleration of the ball, and cause trajectory 10 to change slightly as the speed of the ball is changed. Any changes in the trajectory affect the geometry of the measurement, and thus the measurement angle, and the apparent speed. A curve 36 shows the effects of decreasing the initial speed.

Figure 3A:
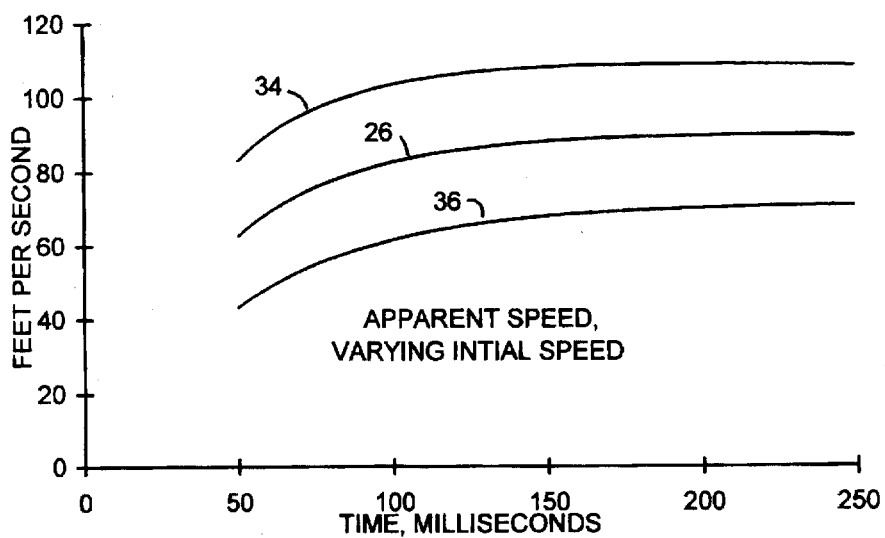
FIGS. 3A, 3B, and 3C are graphs showing the effects on apparent speed of changing the initial launch speed, loft angle, and aim angle.
Figure 3B:
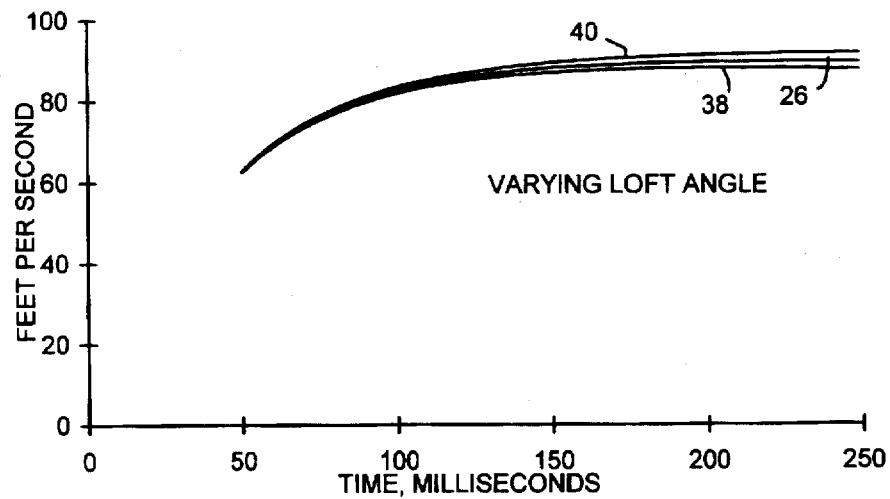

FIG. 3B depicts the effects of changing loft angle of a struck golf ball on the apparent speed as measured by the invention. Once again, curve 26 depicts the result of nominal launch conditions of 100 fps, 20 degree loft θL, and straight aim. A curve 38 illustrates the effect of increasing loft θL by 12 degrees to 32 degrees. An effect of this increase in loft is that the true speed of the ball decreases more rapidly because of the effects of gravity. This causes the apparent speed of the ball to be decreased from that of the nominal launch conditions. Loft angle θL also affects trajectory 10 and thus interacts with the measurement geometry. Decreasing the loft angle has the opposite effect on apparent speed, as shown at curve 40.

Figure 3C:
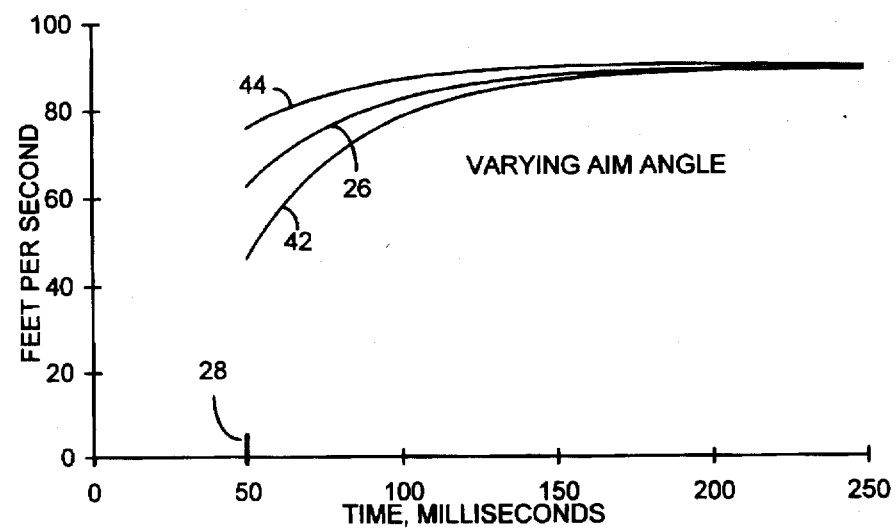

The effects on the apparent speed data of changing the aim of a struck ball are shown in FIG. 3C. Curve 26 again shows the nominal conditions of 100 fps, 20 degree loft, and aim angle θa of zero, corresponding to a ball launched straight. Changing the aim of the ball to +20 degrees, and holding the other launch parameters constant, radically alters the measurement geometry. For this condition, graphed at a curve 42, the measurement angle θm is higher at the start of acquisition 28. This leads to a higher cosine error, and thus a lower apparent speed. Conversely, a ball struck at a negative aim of −20 degrees will have a trajectory 10 more in line with the measurement radial Rs. This will result in an higher apparent speed at the beginning of data acquisition, as shown at a curve 44.

As has been shown, changing any launch parameter affects the entire acquired apparent speed curve. Changes in loft angle θL tend to more greatly affect the latter part of the curve, and changes in aim angle θa more greatly affect the beginning. Changes in initial speed affect the apparent speed more uniformly. While FIGS. 3A, 3B, and 3C show the effects of changing each parameter independently, in fact all parameters interact in a complicated fashion. The effects of changing aim, loft, and speed simultaneously is not simply a linear superposition of each of the effects independently.

The interaction of launch parameters with apparent speed leads to a key underlying principle of the invention: each different combination of launch parameters yields a unique curve of apparent speed (26 of FIG. 2) verses time. In principle, then, if a device can acquire data for apparent speed of the ball with the measurement geometry described, it should be possible to determine which set of launch parameters gave rise to the acquired data. The invention foregoes the simple and direct measurement of true ball speed which would have been produced if the speed sensor had been deployed so as to minimize cosine error. Instead, data from the sensor is a function of time, initial speed, loft angle, and aim angle. Later, a method for detecting the impact of the club against the ball will be described, and thus time need not be considered a variable. The geometry of sensor deployment with respect to tee-off location 18 may be considered to be fixed. A later discussion will consider the possibility that sensor position may be left as a variable. Thus, the function for apparent speed against time has three input parameters: initial speed, loft angle, and aim angle. Each function for theoretical apparent speed, taken with the acquired apparent speed data, conceptually forms an equation. Gathering, say, 20 apparent speed data points thus forms a system of 20 equations, with three unknown variables. In principle it is possible to find a best solution for a system of twenty equations and three unknowns. The system of equations is sufficiently constrained as long as there is sufficient sensitivity of the equations to each of the three unknowns. Thus, determination of the desired launch parameters should be possible.

Figure 4:
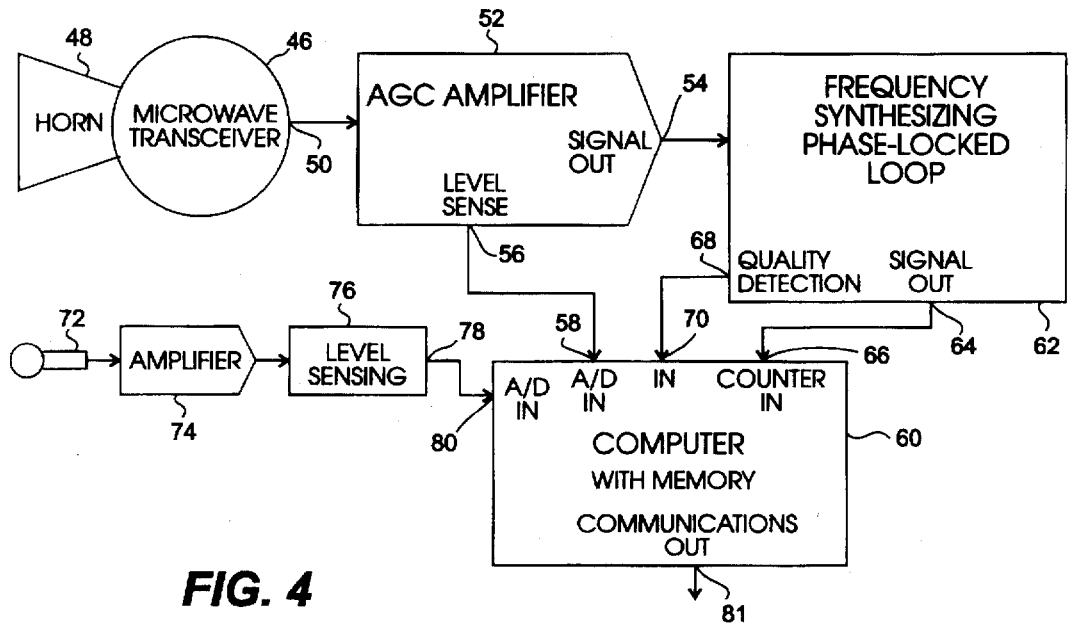
FIG. 4 is a block diagram of the microwave radial speed sensor and associated components.

The nature of data gathered from speed sensor 16 has been described in detail. A block diagram of the electronic circuitry of the speed sensor 16, contained within housing 20, is shown in FIG. 4. The design topology of the speed sensing portion of the circuitry is similar to that employed by conventional police radar guns. A microwave transducer or transceiver 46 is energized by a power supply (not shown,) causing it to emit radiation from a microwave horn 48 at its designed frequency of operation, 24.150 GHz. The horn is designed to produce a wide cone or beam of microwave energy. Preferably, the beam of radiation is about 90 degrees wide, is rotated about 25 degrees towards the straight path, and deployed at an elevation angle of about 20 degrees. The beam is wide, and the decay of the intensity of the beam near the edges is gradual, so the orientation of the beam is not critical.

Some of the energy is reflected off the moving struck golf ball, which shifts the frequency of the energy because of the well-known Doppler effect. The reflected energy reenters horn 48, after which transceiver 46 mixes the received energy with a portion of the transmitted energy. This mixing produces a small ac voltage at the output terminal 50 of the transceiver, of frequency proportional to the shift in frequency of the microwave radiation. As explained earlier, the frequency of the transceiver output voltage will be proportional to that portion of the ball's true speed which subtends a radial drawn from the transceiver to the ball. That subtended speed is the apparent speed, as measured by transceiver 46. The frequency of the transceiver output signal will thus be 48.98 Hz for every foot per second of apparent speed. The amplitude of the signal is low, and on the order of a few microvolts.

Transceiver output terminal 50 is coupled to an amplifier 52, featuring an Automatic Gain Control. Because the signal level from the transceiver is low, the performance of the amplifier is critical. The amplifier used in a prototype of the invention features a noise floor within one dB of the theoretical limit imposed by thermal considerations. The amplifier 52 produces a signal at an output terminal 54 with an amplitude of about 6 volts, measured peak to peak. Further, the amplifier produces a signal level sensing output at a terminal 56 which produces a voltage proportional to the intensity of the received microwave signal. Signal level sensing output 56 is coupled to an analog-to-digital converter input 58 of a computer 60.

Output 54 of amplifier 52 is coupled to a frequency-synthesizing phase-locked loop (PLL) 62. The PLL synchronizes an internal oscillator to the amplifier signal, locking on to it and multiplying the frequency of the signal by a factor of sixteen. Such PLLs are commonly employed in radar sensing devices because they impart an inherent ability to reject noise and interference, and provide for greater resolution in measuring the frequency of the resulting signal. The design of AGC amplifiers and PLLs is well understood, and the details are omitted here. The signal output terminal 64 of the PLL is coupled to an input 66 of computer 60.

Preferably, input 66 features a counter to facilitate the process of measuring frequency. Additionally, PLL 62 features a signal quality output 68, indicative of the strength of the PLL lock, coupled to computer 60 via an input 70.

Also contained within housing 20 is a microphone 72, aimed in the general direction of tee-off location 18. Microphone 72 is connected to an amplifier 74, which is in turn connected to a level-sensing circuit 76. An output terminal 78 of the level-sensing circuit 76, thus configured, produces a voltage proportional to the acoustic sound level present. The impact sound of the club striking the ball causes the level sensing output voltage at terminal 78 to rise momentarily. Terminal 78 is connected to an analog-to-digital converter input of computer 60. Further, computer 60 includes communications means 81 for reporting extracted launch parameter information.

Software and memory locations within computer 60 are disposed to gather a data matrix or array of measured apparent speed data (MEAS_APPAR_SPEED[I]) from the speed sensor, at a sample interval of 5.1 milliseconds. There are N such data points gathered, indexed by a variable (L). The programming of such software is readily accomplished by one skilled in the art of computer-based data acquisition. A graphical representation of typical MEAS_APPAR_SPEED[I]data acquired by the invention is presented as diamond shapes generally at 82 in FIG. 5. The data of FIG. 5 was acquired by the prototype of the invention for a struck ball which landed a radial distance of 36 yards from the tee, at an aim angle of 33 degrees. One acquired apparent speed data points is deemed of poor quality by the PLL. This missing data point is set to zero by the computer and subsequently disregarded, and is thus missing at location 84. Additionally, a signal proportional to the level of the received microwave signal is stored in an array within the computer.

The computer is programmed with software and algorithms to extract the launch parameters of the struck golf ball. The major elements of the parameter determination process are a search algorithm, an error function, and a trajectory prediction algorithm, which together comprise a successive approximation method. The following is a table showing the names of the variables used within the computer and in the accompanying flowcharts, along with their meanings:

| Variable | Meaning |
| --- | --- |
| ACQD_APPAR_SPEED[I] | array of acquired apparent speeds, fps |
| I | index of apparent speed array |
| N | number of acquired apparent speeds |
| SPBBD | magnitude of speed of ball, fps |
| Cd | coefficient of drag |
| Cl | coefficient of lift |
| DRAG | acceleration due to aerodynamic drag, f/s² |
| LIFT | acceleration due to lift f/s² |
| Xb | x position of ball, ft |
| Yb | y position, ft |
| SPEED_X | x component of speed of ball, fps |
| SPEED_Y | y component of speed of ball, fps |
| ANGLE_F | angle of flight of ball, degrees |
| ANGLE_A | angle of aim of ball, degrees |
| ANGLE_M | angle of measurement |
| D | distance from speed sensor to tee, ft |
| RS | radial distance from sensor to ball, ft |
| RT | radial distance from ball to tee, ft |
| PRED_APPAR_SPEED[J] | array of predicted apparent speeds of the ball |
| J | index of predicted speed array |
| OFFSET | offset of predicted and apparent speed |

-continued

| Variable | Meaning |
| --- | --- |
| | arrays |
| ERROR | error value |
| BBST_INIT_SPEED | best running guess of initial speed |
| BEST_ANGLE_F | best running guess of angle of flight of ball |
| BEST_ANGLE_A | best running guess of angle of aim of ball |
| PK_SPEED | highest value in ACQD_APAR_SPEED[] |
| K | guess counter |
| E_THRESH | error threshold |

The computer is programmed with software that contains an a priori mathematical model of the ball trajectory. Mathematical models for computing the trajectory of golf balls have been well developed in the literature, and the reader is referred to a paper entitled Golf ball aerodynamics, by Bearman, P. W. and Harvey, J. K. published in Aeronautical Quarterly, 27, pp. 112–122 in 1976. Further, the software contains a mathematical model for analyzing the measurement geometry concerning the radial speed sensor and ball trajectory, and predicting apparent speed based on the predicted trajectory.

Figure 6:
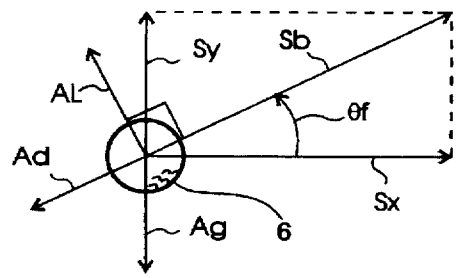
FIG. 6 is a diagram depicting the geometry of the per-sample trajectory prediction.

The forces acting upon a golf ball in flight are presented schematically in FIG. 6. Sb represents a true speed of the ball for the sample under consideration, dram along the direction of flight, and corresponds to the variable SPEED in the ensuing flowcharts. This speed may be separated into a horizontal component Sx and a vertical component Sy, represented in the software as SPEED_X and SPEED_Y, respectively. Acting on the ball in opposition to its forward movement is a negative acceleration due to air drag Ad, represented as variable DRAG. Acting in downward direction is a constant acceleration Ag due to the effects of gravity. At a right angle to the direction of motion is an effect of aerodynamic lift AL, which is modeled in the software as variable LIFT. An angle of right θf of the ball is positive as shown.

Figure 7:
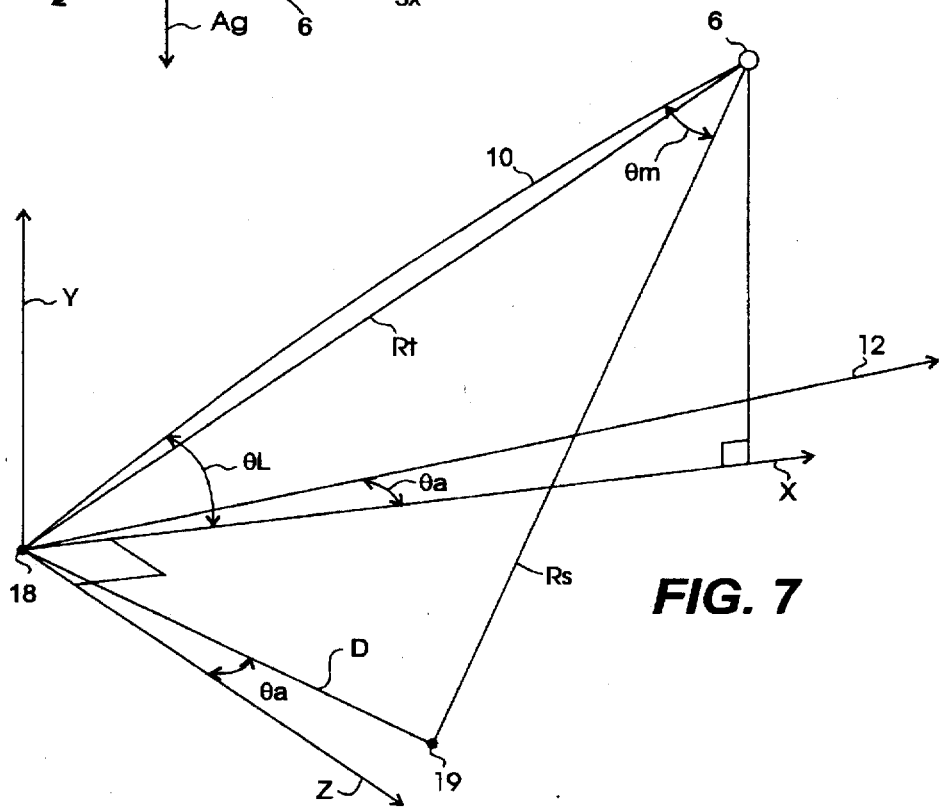
FIG. 7 illustrates the measurement geometry of the radial speed sensor.
Figure 8:
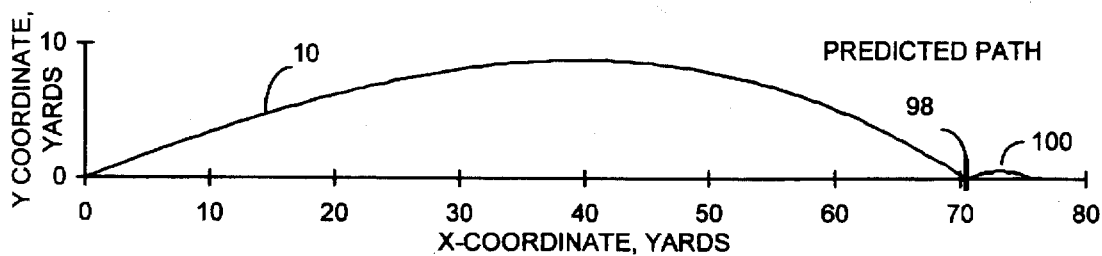
FIG. 8 shows a typical ball trajectory, as predicted by the trajectory prediction algorithm.

The measurement geometry of the radial speed sensor is illustrated in FIG. 7. Calculations are made assuming an x-y-z coordinate system, as shown by axes X, Y, and Z on the figure. To simplify the mathematics of the trajectory algorithm, axes are set such that ball 6 travels entirely within the x-y plane. To accomplish this, axis X is lined up with the true aim of the ball. The X axis is not the straight line 12 down the fairway or driving range. Axis Y is straight up, and axis Z is in the horizontal plane, at 90 degrees from the X axis. The speed sensor is at a location 19 distance D from the tee, at angle with respect to the Z axis of θa, with the sign of θa taken to be positive as shown. The illustration corresponds to a ball aimed somewhat to the right. Line Rs forms a radial, having a distance, from the sensor to ball 6, and a line Rt forms a radial from tee-off location 18 to ball 6. Trajectory 10, loft angle θL, and measurement angle θm are as shown. The coordinate system thus shifts with the aim of the ball, rather than being fixed in relationship to the ground. The equations of motion of the ball are greatly simplified by using this coordinate system. A side view of trajectory path 10 is presented at FIG. 8, shown over an entire unobstructed flight of the ball.

Figure 9:
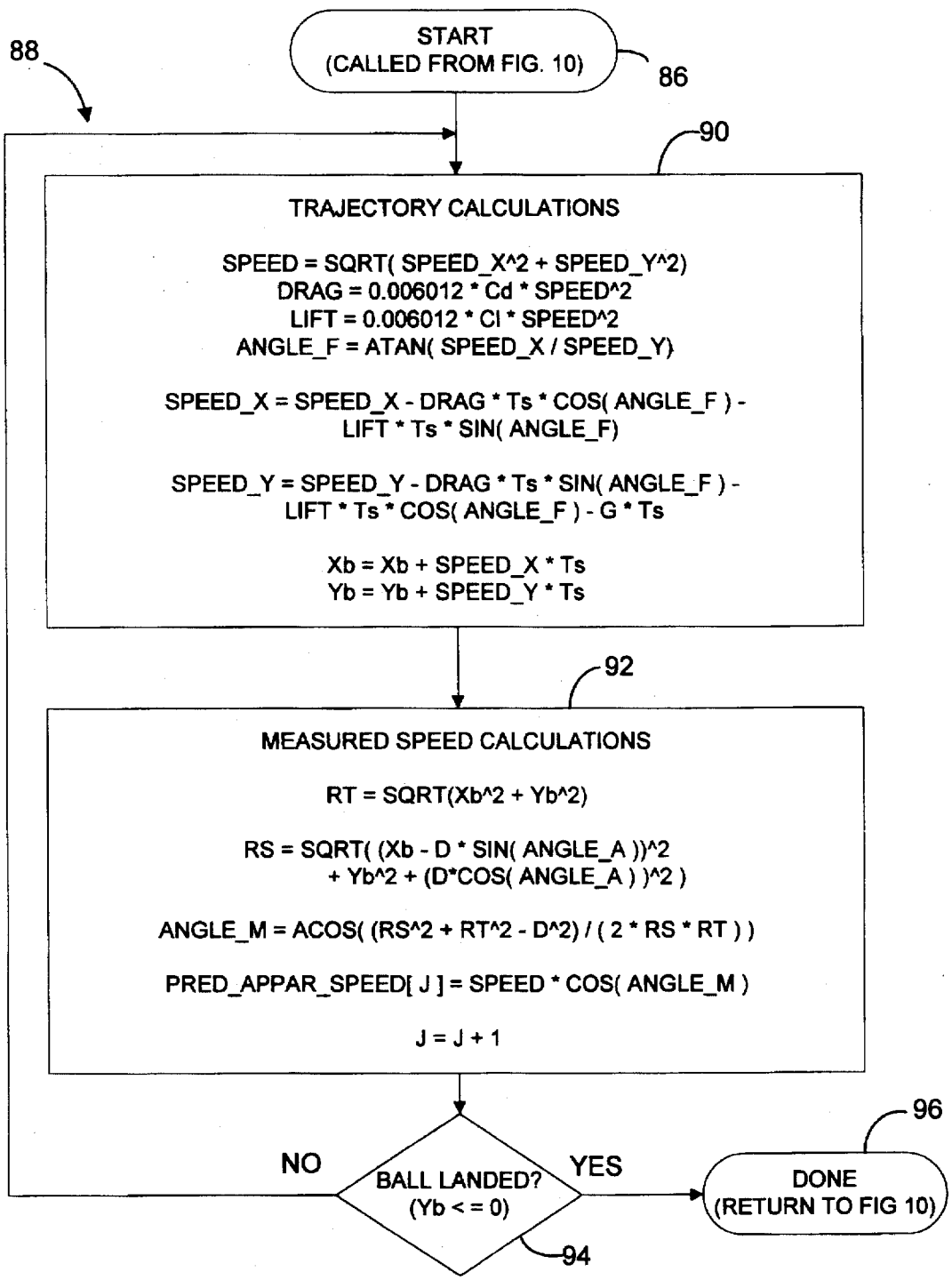
FIG. 9 is a flow chart of the trajectory prediction algorithm.

FIG. 9 is a flow chart of the trajectory and apparent speed prediction algorithm used in the invention. The algorithm is called from an error function shown in FIG. 10, which sets the initial conditions, and will be described later. Thus, the algorithm commences execution at a step 86, with the variables for ball speed horizontal component (SPEED_X), vertical speed component (SPEED_Y) and aim angle (ANGLE_A) set to correspond to the initial conditions for a ball just launched off of the tee. The X coordinate variable (Xb) and Y coordinate variable (Yb) of the ball are each set to zero, corresponding to the position of the tee. Next, the trajectory algorithm enters the flight loop, generally at 88.

Upon entering flight loop 88, the computer performs a step 90 of executing per-sample trajectory computations. This consists of executing the illustrated set of formulas, resulting in a new ball position (Xb, Yb) and speed (SPEED_X, SPEED_Y.) The formulas in this and other flowcharts are illustrated with these conventions: "^" is the exponentiation operator, "*" is the multiplication operator, and "%" is the modulo operator. Other functions will be apparent to those familiar with the art of computer programming. As intermediary steps in the trajectory computation block 90, the program calculates a magnitude of the ball speed (SPEED) and a value for the angle of flight (ANGLE_F.)

The SPEED is in turn used to calculate the magnitudes of aerodynamic drag (DRAG) and lift (LIFT.) For the latter calculations, it is necessary to use a coefficient of drag (Cd) as well as a coefficient of lift (Cl.) These coefficients are taken from published information about golf ball aerodynamics, such as the Bearman, et at. paper referenced previously. In such published sources, aerodynamic coefficients are measured using wind tinreel analysis, calculated using finite element analysis, or calculated using classical aerodynamic formulas. The coefficients (Cd, Cl) vary with speed (SPEED) and ball spin rpm (not illustrated), and are stored in look-up tables. Ball spin rpm is assumed to be a nominal value for the launch conditions of the ball. Further constants within block 90 are the gravitational acceleration constant G, in feet per second squared, at 32.2, and the sample interval in seconds Ts, at 0.0051.

Continuing in FIG. 9, the computer proceeds to execute a block 92 of measured speed calculations. Block 92 determines the value of the apparent speed that would result from the ball speed and position as calculated by the previous block 90. This step consists of executing a series of formulas in the order shown. The formulas may be readily derived from a consideration of the geometry illustrated in FIG. 7. As intermediary steps, the computer calculates variable values for a length (RT) of radial Rt to the tee, a length (RS) of radial Rs to the sensor, and a value (ANGLE_M) of the measurement angle θm.

The predicted apparent speed for the sample under consideration is stored as an element in an array (PRED_APPAR_SEED[J]) with and index (J.) With each pass through block 92, index J is incremented. Completing the trajectory prediction loop, a decision block 94 determines if the ball has landed. This is done by comparing the vertical position Yb of the sample under consideration with zero, which corresponds to ground level. If the ball has not yet landed, control passes back to the top of flight loop 88 at block 90, and the trajectory prediction process continues. Once the ball has landed, the trajectory prediction algorithm is done at a block 96, and control is passed to the calling error function of FIG. 10.

Development software which includes the trajectory algorithm of FIG. 9 was written for the purposes of producing a prototype of the invention. This software, which is not illustrated, has the capability of writing data pertaining to trajectories to files, and was used in generating figures for this document. FIG. 8 illustrates typical trajectory path data as generated by the prototype development software. As the trajectory algorithm is run, the ball Xb and Yb coordinates are saved to a file. A series of x-y coordinates representing a ball in flight is graphed as trajectory line 10 in the figure. The resulting predicted carry distance 98 is extracted by noting the Xb coordinate of the simulated ball when it lands. The trajectory prediction algorithm of the invention shows good agreement with published estimates of carry distance, indicating an accurate mathematical model. In FIG. 8, the ball bounces once in a bounce trajectory 100, and then rolls. An algorithm for these predictions is a straightforward extension of the trajectory determination algorithm, and assumes that a predetermined percentage of the energy of a ball is retained after the ball bounces on the fairway. As FIG. 8 shows, determining the launch parameters of the ball is akin to determining the entire trajectory of the ball.

Figure 10:
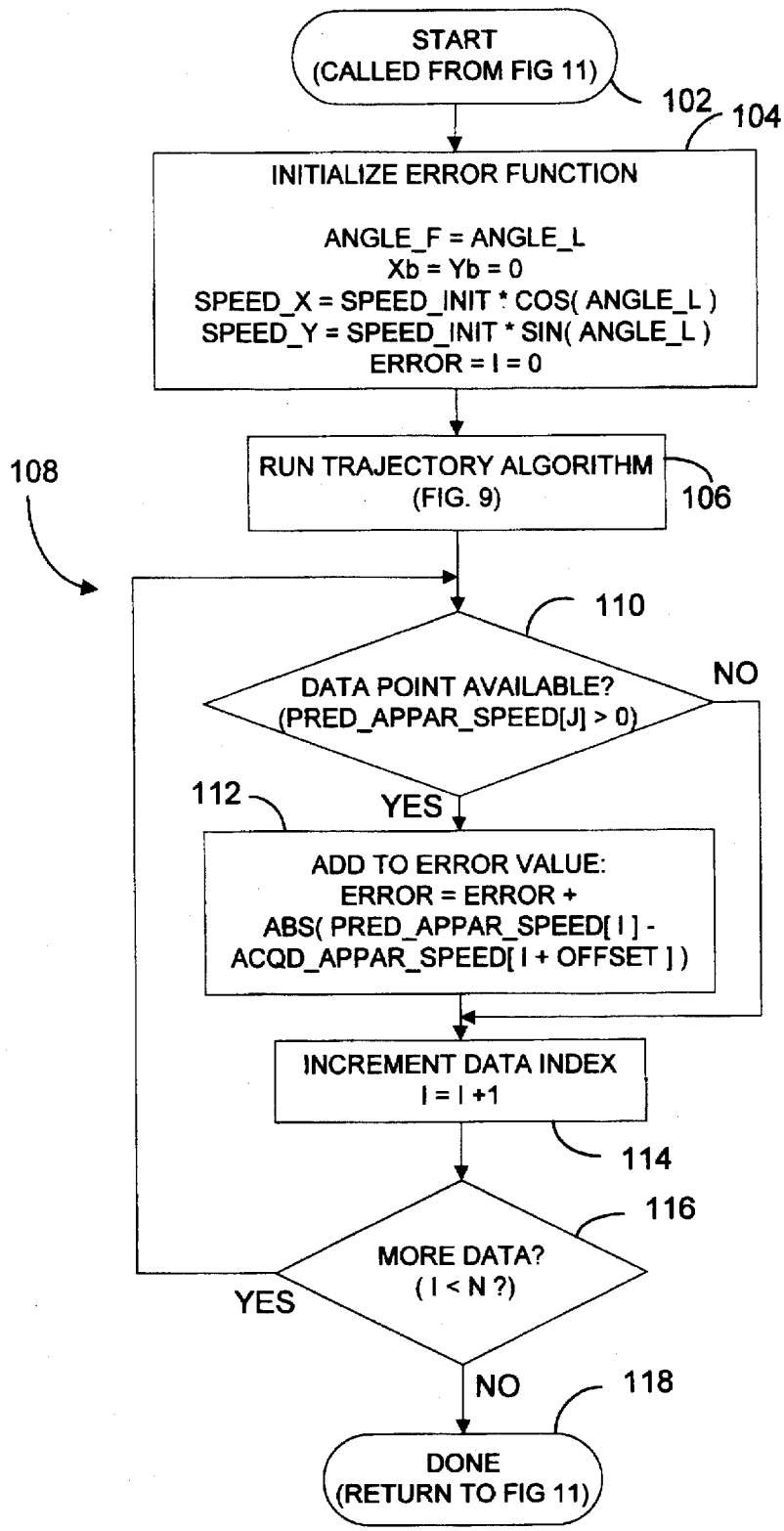
FIG. 10 is a flow chart of the error function.

For the purposes of implementing the invention, the trajectory function algorithm is called from an error function, which is flow-charted in FIG. 10. The error function determines how closely predicted apparent speed data from the trajectory algorithm comes to matching actual apparent speed data gathered from a struck golf ball. The function returns an error value (ERROR). A higher ERROR value corresponds to a poorer match of the data. The predicted trajectory is based on a guess of launch parameters which is consists of an aim angle (ANGLE_A), a loft angle (ANGLE_L), and an initial ball speed (SPEED_INIT.)

Figure 11:
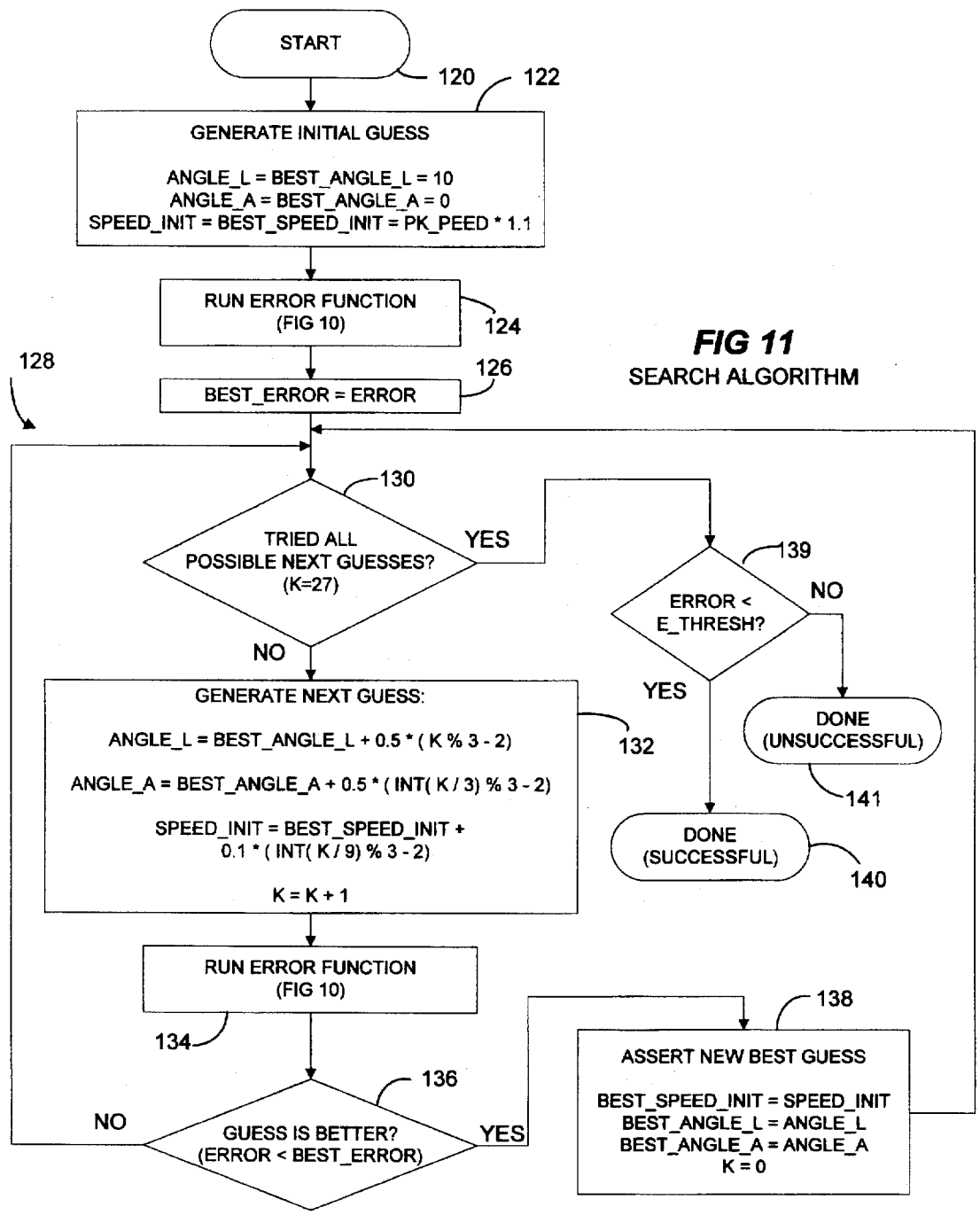
FIG. 11 is flow chart of the search algorithm.

The error function begins at a block 102, and is called from a search algorithm which is illustrated in FIG. 11 and will be described later. A first step 104 of the error function is to initialize the error function values using the formulas shown. In step 104, the position of the ball (Xb, Yb) is reset to the origin, or zero, corresponding to the location of the tee. SPEED_X and SPEED_Y are initialized as shown, ERROR is reset to zero, and the acquired data index (I) is reset to zero. Next, the trajectory algorithm is run at a block 106, using the initial conditions as set by the guess. Control is passed to an error function loop 108, which will step through all of the available dam. Because the acquired data begins some number of samples after the ball is struck, the corresponding predicted and actual data samples are offset by a number of samples given in variable OFFSET. The process for determining the value of OFFSET will be described later. As a first step in error loop 108, a decision block 110 determines if there is actual data corresponding to the predicted speed sample under consideration, corresponding to a nonzero entry in PRED_APPAR_SPEED[J]. If there is corresponding data, a block 112 computes the absolute value of the difference between the actual and the predicted data, and adds it to the error value. Next, block 114 increments loop counter I, and then decision block 116 determines if there is additional data available. If there is, the loop continues at block 110. If the decision block 110 had determined that there was no actual data available for the sample under consideration (such as at location 84 of FIG. 5), block 112 would have been skipped. Thus, samples for which no data is available do not figure into the error function calculations. Once all available acquired data in ACQD_APPAR_SPEED[]has been compared to the theoretical data in PRED_APPAR_SPEED[], the error function is done at a block 118. From there, control passes back to the calling search algorithm (FIG. 11.)

The search algorithm is flow-charted in FIG. 11. The search algorithm finds which set of initial parameters best accounts for the actual acquired speed data. The calculations of the search algorithm commence at a block 120 after the computer has acquired a sufficient number of high quality apparent speed data points. As a first step 122 in the search algorithm, parameters corresponding to a best guess of initial parameters are set. The best guess of launch parameters is comprised of variables corresponding to the most accurate available estimate of initial speed (BEST_INIT_SPEED), aim angle (BEST_ANGLE_A), and loft angle (BEST_ANGLE_L.) A guess under consideration, comprised of INIT_SPEED, ANGLE_A, and ANGLE_L, is set to the same values of the best guess.

The initial guess need not be accurate for the invention to work. A reasonable starting point would be to set the loft angle (ANGLE_L) to ten degrees, and the aim angle (ANGLE_A) to zero. The initial speed (SPEED_INIT) may be set to 1.1 times the highest value stored in ACQD_APPAR_SPEED[], that value being represented here as PK_SPEED. In an optimal rendition of the invention, precomputation techniques, which will be described later, may be implemented for a more accurate initial guess. The accuracy of the initial guess affects how long it takes for the search algorithm to arrive at a solution, but does not affect the accuracy of the invention. A guess counter (K) is also set to zero. The next step of the search algorithm is to compute an error value for the initial guess, by calling the error function (FIG. 10) at a block 124. The returned ERROR value is by default the best error value (BEST_ERROR) so far, so BEST_ERROR is set to ERROR at a block 126.

With these preparations completed, a search loop 128 begins. A first step of search loop 128 is to determine if all of the possible next guesses have been tried, corresponding to K=27, shown at a decision block 130. This will not be the case for the first time through the loop, and control will flow to a block 132, which will generate the next guess. In block 132, guess counter K is used in conjunction with the equations shown in the figure to generate a new plausible set of initial parameters (ANGLE_L, ANGLE_A, INIT_SPEED.) Block 132 will in turn adjust each of these parameters slightly up and slightly down from the running best guess of parameters (BEST_ANGLE_L, BEST_ANGLE_L, BEST_INIT_SPEED.) A block 134 will then run the error function for this new set of parameters.

Next, a decision block 136 determines whether the guess under consideration is better or worse than the best guess so far. It does this by comparing the new error value (ERROR) with the BEST_ERROR so far achieved. If the ERROR is indeed lower, then the guess under consideration is better. In this case control passes to a block 138 which asserts a new best guess. This is done by setting each of the BEST parameters to the corresponding guess under consideration, as shown by the illustrated formulas. Also, the guess counter K is reset.

After execution of block 136, and possibly after asserting a new best guess at block 138, control passes back up to the top of search loop 128. Once again, decision block 130 will ascertain that not all possible guesses had been tried. Block 132 will generate another plausible best guess, and the process continues through the loop. This process will continue in a similar fashion, with block 132 generating different combinations of aim, loft, and speed. Block 132 will vary each of the parameters independently, as well as changing two or three parameters simultaneously, in all possible combinations. Some of these combinations will result in better guesses, resulting in execution of block 138. The search loop continues until decision block 130 asserts that all possible next guesses have been tried. At that point, no perturbation of loft, aim, and initial speed, in any combination of parameters, results in a lower error function. Computer 60 executes a decision block 139, which ascertains whether ERROR is below a threshold (E_THRESH). If it is not, then the ACQD_APPAR_SPEED[]data was probably a result of interference, and the search is concluded unsuccessfully at 141. This will be explained in greater detail in the operation section. If, conversely, ERROR is below E_THRESH, then the computer was able to find a satisfactory match, and the solution is valid. Thus, the search algorithm is finished at 140, with the results stored in the BEST parameters (BEST_INIT_SPEED, BEST_ANGLE_L, BEST_ANGLE_A) being the extracted launch parameters.

In addition to the hardware and software elements described thus far, the invention also incorporates a means for detecting when the club impacts the ball. This information is used to calculate the number of offset samples, OFFSET, which is used in the error function. As was previously described, the computer 60 is operationally disposed to gather sound level data from a microphone 72. Software in the computer continuously acquires data from level sensor 78. The search algorithm calculations are initiated by the acquisition of a sufficient quantity of high quality data. Acoustic level data from the microphone for 200 milliseconds prior to the acquisition of the received speed sensor data is retained by the computer. Data prior to that point is continuously discarded.

Figure 12A:
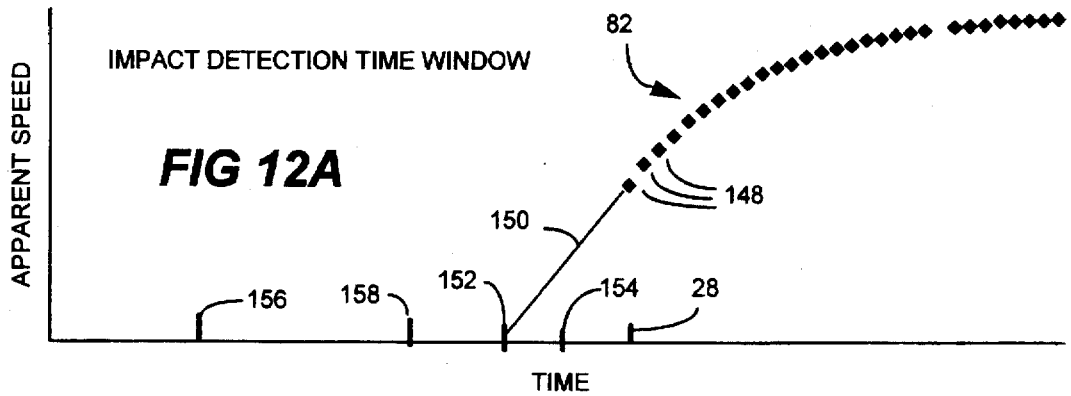
FIGS. 12A and 12B illustrate the process of impact detection.
Figure 12B:
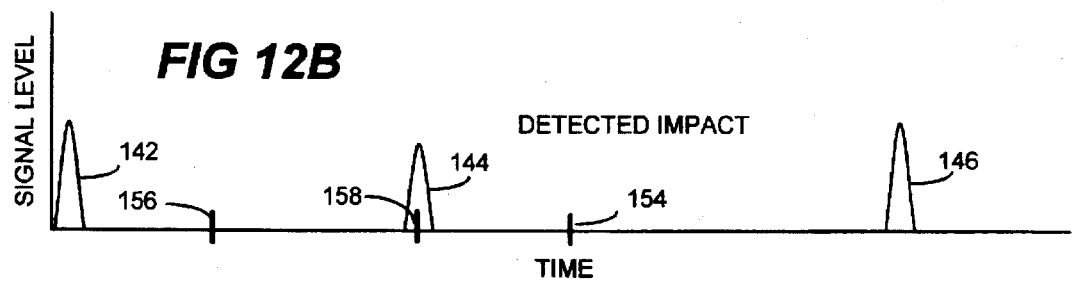

FIG. 12A graphs acquired apparent speed data at as a series of diamond shapes 82. FIG. 12B graphs acquired acoustic signal level data. First, second, and third periods nonzero level data is presented at 142, 144, and 146. Within the computer, the first three speed data points 148 are used to generate a line 150 which extrapolates back to zero speed. The intersection of the line 150 with zero speed forms a nominal impact time 152. A value (nominally 20 milliseconds) is added to the nominal time 152 to form an upper window limit 154, and a value (nominally 130 milliseconds) is subtracted to form a lower window 156 limit. The time interval between lower 156 and upper 154 limits comprise a window in which the impact of club on ball is plausible.

The computer examines the acoustic signal level data within the window (156, 154), and selects a time 158 at which the peak value of sound level occurs to be the actual moment of impact. Moment of impact 158 is subsequently considered to be at a time value of zero. OFFSET, given as a number of samples, is the difference between actual impact time 158 and time 28 of the first apparent speed data, divided by the sample interval. Fluctuations in sound level which lie outside the impact window in time are considered to be noise and disregarded. This arrangement prevents the unit from being triggered by extraneous sounds, especially those arising from the swings of nearby golfers whom are not playing the simulation. Signal data at 142 and 146 represents data from such extraneous sounds.

This arrangement, in which impact data is examined after speed data is acquired, permits far greater noise immunity than does a trigger method. A trigger is responsive to sound continuously. The retrospective impact detection of the invention is responsive to sound for only a short window of time. Further, a trigger method will typically require some manner of threshold. If set high enough to avoid false triggers, the threshold may preclude detection of the desired impact. In contrast, the computer of the invention searches for the highest sound level point within the prescribed window (156, 154), obviating the need for a fixed threshold.

The computer is also connected to communication means (81 of FIG. 4) so that the extracted launch parameters may be put to use. Preferably, this means is connected (with wire 160 of FIG. 1) to some manner of golf simulator, which is not illustrated. This simulator may take the form of a video display unit located near golfer 2. It is contemplated that the video display unit would include a computer, and would resemble a conventional video arcade game. Alternatively, the communication means 81 may be connected to a numeric readout. This readout could directly display the extracted launch parameters, to be used in golf training and practice.

OPERATION OF THE INVENTION

Figure 5:
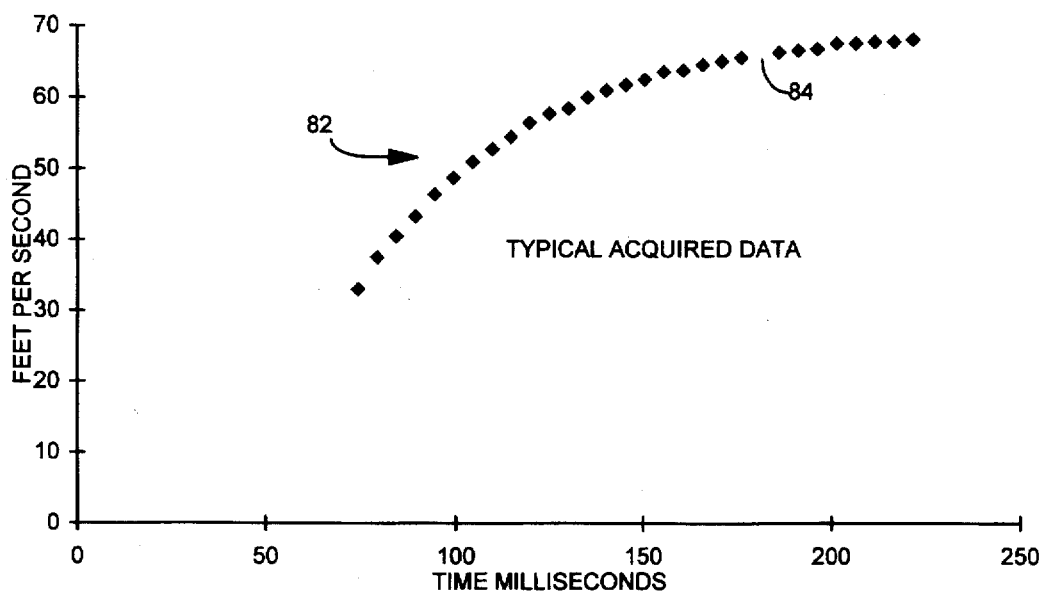
FIG. 5 is a graph of apparent speed data as typically acquired by a prototype of the invention.

In operation, golfer 2 stands before tee-off location 18 holding club 4, as is illustrated in FIG. 1. Golfer 2 swings club 4, propelling golf ball 6 along trajectory 10, into beam 22 radiated by speed sensor 16. Energy, shifted in frequency by the Doppler effect, is reflected off the ball and received by sensor 16. The circuitry of the invention, shown as a block diagram in FIG. 4, gathers apparent speed data into computer 60, wherein it is stored in array ACQD_APPAR_SPEED[I]. Typical data 82, as gathered by the computer, is illustrated in FIG. 5. Once a sufficient quantity of data had been gathered, or there is no more speed data available, the computer begins the parameter determination process. As a first step in parameter determination, the computer uses the impact detection methods illustrated in FIGS. 12A and 12B to ascertain the moment 158 at which the club strikes the ball. From this information the computer calculates the number of offset samples (OFFSET.)

Once the array (ACQD_APPAR_SPEED[I]) of nominally valid apparent speed data is acquired, the computer commences the search algorithm, which is illustrated at FIG. 11. As a first step of the search algorithm, block 122 produces an initial guess of the launch parameters. Subsequently, block 124 runs the error function (illustrated at FIG. 10) to ascertain the merit of the initial guess. As part of running the error function, the computer will predict a nominal trajectory and predict apparent speed, using the algorithm set forth in FIG. 9.

Figure 14:
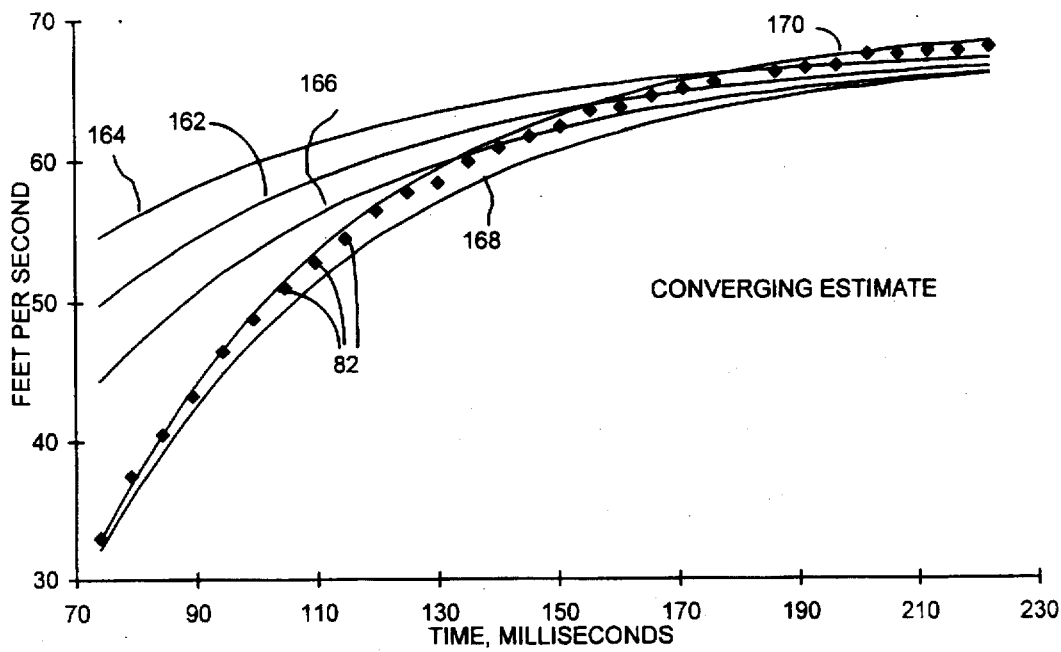
FIG. 14 is a graph showing successive guesses of a converging estimate, illustrating operation of the search algorithm and successive approximation process.

The search algorithm may be thought of as a successive approximation process or a converging estimate. An example of such a converging estimate is illustrated in FIG. 14. The predicted apparent speed array (PRED_APPAR_SPEED[J]) which would result from a plausible initial guess is illustrated as a curve 162. This curve arises from a loft angle of 10 degrees, an aim angle of zero, and an initial speed of 75 fps. Typical actual apparent speed data, as acquired by a prototype of the invention, is shown as set of points 82, shown as diamond shapes in the figure. The predicted results of the initial guess deviate a great deal from the actual data collected. Thus, the error function returns a high ERROR value of 115.9, indicating that the initial guess is not very good.

Later in the search algorithm (at block 132 of FIG. 11) the computer generates a next guess. For purposes of illustration, the computer may change the aim angle to −10 degrees. This results in the predicted apparent speed curve shown at 164. This is a poorer match to the actual data, resulting in a higher ERROR of 158.8. Thus, this guess is not retained as an improvement, and the search algorithm tries another guess. A later guess which changes the aim angle to +10 degrees results in a curve 166 which more closely approximates the actual data. This results in an ERROR of 78.9 and this guess is retained as the new best, by the execution of block 138 of FIG. 11.

Given the success of the increased aim angle, a later guess from the computer might try a larger aim angle still. Curve 168 shows the predicted apparent speed of a ball launched at 75 fps, a loft angle of 10 degrees, and an aim angle of 30 degrees. This results in an ERROR of 49.6, indicating that the search algorithm is converging on the true solution. Curve 170 shows a later guess still, for a ball launched at 77.2 fps, lofted at 10 degrees, aimed at 33 degrees, and resulting in an ERROR of 14.9. The process of successively better guesses continues in a similar fashion. The process continues, varying speed, aim, and loft angle. Each parameter is varied alone and in combination with the other parameters, until no combination of new parameters results in a lower ERROR value. The best guess found by the search algorithm is reported by computer 60 via communications means 81 as the extracted launch parameters. Optionally, the trajectory prediction algorithm of FIG. 9 may be used to predict the ball landing position.

In order to best illustrate the successive approximation method, the different guesses illustrated in FIG. 14 are the result of large steps of each of the parameters. In a practical rendition of the invention, the parameters are changed by small amounts. The values in block 132 of FIG. 11 correspond to speed changes of 0.1 fps, aim angle changes of 0.5 degrees, and loft angle changes of 0.5 degrees. The scale of FIG. 14 has been set to accentuate small differences in apparent speeds. It is essential that parameters be varies simultaneously, in order prevent the search algorithm from getting stuck on local minima.

Figure 15:
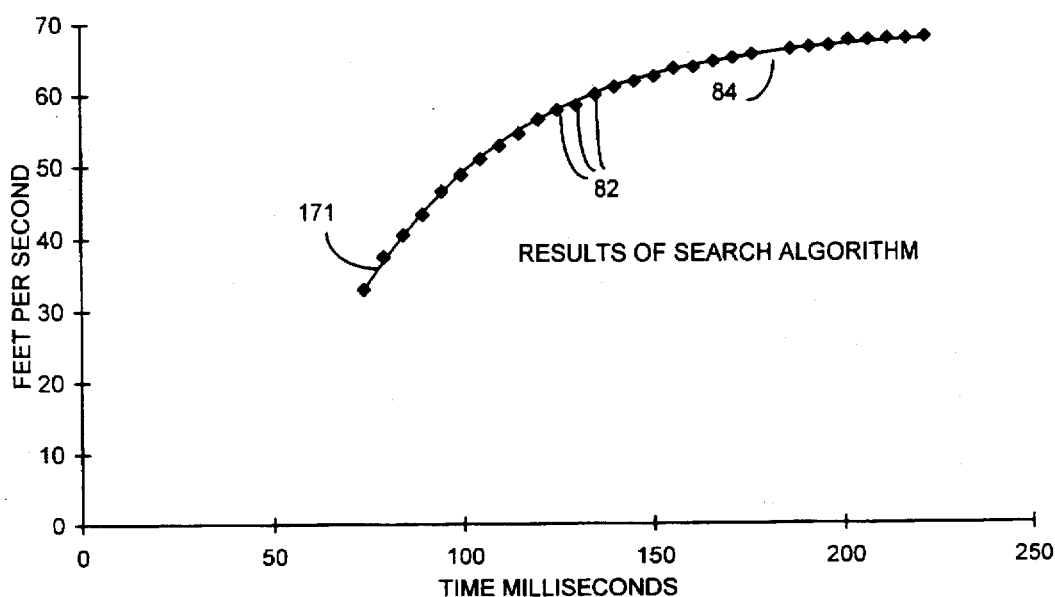
FIG. 15 graphs the results of the search algorithm, showing predicted speed data, along with actual data as gathered by a prototype of the invention.

Typical results obtained by the search algorithm for the prototype of the invention are graphed in FIG. 15. Data points 82 show the actual speed data acquired by the prototype, again as diamond shapes. To generate the data, a golf ball was struck with a 5 iron, and the ball landed a radial distance of 36 yards from the tee, at an aim angle of +33 degrees from straight into the driving range. A curve at 171 shows the speed predicted by the invention. This prediction was arrived at after 369 iterations of search loop 128, and corresponded to a ball launched at 77.2 fps, at a loft of 14.9 degrees, and an aim angle of 33 degrees. The final ERROR value was 6.3. Based on the trajectory algorithm (FIG. 9), the invention predicted that the ball would fly a distance of 36.1 yards, at an angle of 33 degrees. Thus, the predicted ball landing location was within the one yard measurement accuracy with which the actual landing location data was taken.

Instruments to independently measure initial speed, loft angle, and aim independently were not available in testing the prototype. However, the close correlation between actual and predicted ball landing positions would indicate that the individual parameters were extracted accurately. In the development of the prototype it was found that even modest changes in each of the parameters from the extracted best-guess tended to yield much higher ERROR values. This would also tend to indicate good accuracy of the extracted parameters. Also, because no empirical corrections for cosine error are needed in the invention, the determination of initial ball speed is probably more accurate than could be achieved with a more direct measurement of ball speed which would be achieved by placing the speed sensor along the straight aim line.

Once the computer has successfully extracted the launch parameters of the struck golf ball, this information is preferably communicated via cable 160 (shown in FIG. 1) to a second computer within a video display unit located near golfer 2. Preferably, the video unit is equipped to accept coins or tokens. The video unit displays a three dimensional simulation of a golfer ready to tee off on a fairway of a golf course. Next, the second computer causes the video simulation of a golfer to strike a simulated ball with what appears to be the same launch conditions of actual ball 6, as extracted by the search algorithm. The video simulation will then display the flight of the simulated ball, in a fashion which mimics trajectory 10 of actual ball 6. The view on the video screen will then switch to the location where the ball would have landed had the golfer been playing on an actual golf course. To simulate a golf game, the golfer's second shot will not be from a golf tee.

Before taking a second shot, the golfer places a golf ball adjacent to the tee, in the same general toe-off location 18. The invention is not sensitive to small displacements in the ball launching position. The golfer takes a second shot, using whatever club he or she sees fit to best reach the simulated hole. The acquisition, determination, and simulation process continues. Once the simulated ball lands upon the simulated green, the computer displays a simulation of a golfer putting the ball into the hole. The video unit shifts the view to that of a different simulated tee-off position, and process begins again. Continuing in such a fashion, the golfer plays a simulated game of golf.

In addition to the normal method and mode of operation which has been described herein, the invention also includes provisions for dealing with interference. Such interference may come from extraneous golf balls or other moving objects, noise within the microwave transceiver, or amplitude fluctuations in the received signal. The latter fluctuations are typically induced by Voltage Standing Wave Ratio (VSWR) within the microwave transceiver. One of the possible effects of such interference is missing data, as is shown at 84 in FIG. 15. It is evident from the figure that the parameter determination methods of the invention are tolerant of missing data. The invention does not discern discreet or different regions of the data. Rather, the search algorithm will seek to achieve a best fit to the data available. While more available data aids the accuracy of the parameter determination process, missing data does not preclude it.

An additional source of interference is that of balls struck by golfers at adjacent tee-off stalls. It has been found empirically that the PLL does not lock on to ball struck from two stalls away. It is possible, however, for the PLL to lock onto an extraneous ball struck from an adjacent stall, especially if that ball is aimed into beam of radiation 22. In such case, the search algorithm will attempt to find a solution. Because the geometry of the speed sensor with respect to the interfering golfer is radically different from that assumed in the mathematical model of the measured apparent speed prediction algorithm, it will not be possible to find a set of launch parameters that properly accounts for the acquired speed data. An example of data from an interfering golfer is graphed as a series of points 172, shown as diamond shapes, at FIG. 13. The best solution found by the search algorithm is shown as a curve 174. The computer has selected a trajectory that results in a very high positive error for early points in the trajectory, and lower, negative error for the more numerous later points. There is no combination of launch parameters which yields a better solution.

Figure 13:
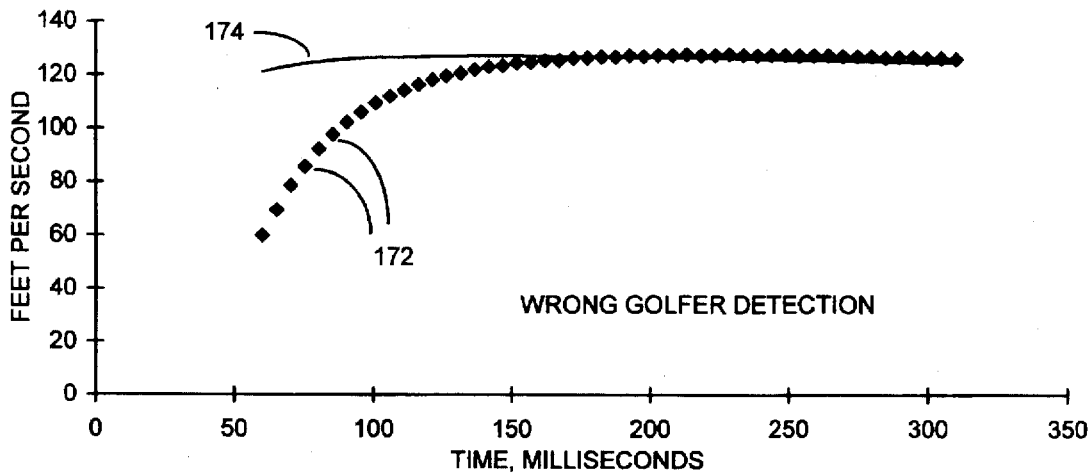
FIG. 13 is a graph of received apparent speed and best fit predicted apparent speed from an interfering golf ball, showing a poor match of predicted and actual data.

Thus, data from an interfering golfer will give rise to an unacceptably poor solution. The invention exploits this fact by comparing the ERROR value against a threshold, and rejecting the solution if the ERROR is unacceptably high. In the example of FIG. 13 the value of ERROR is 432. E_THRESH has a value of, say, 25. Upon completing search loop 128 of FIG. 11, block 139 will determine that the ERROR exceeds E_THRESH, and that the solution is therefore invalid. Thereafter, the computer unsuccessfully terminates the search algorithm at block 141. In such case, no extracted parameters are communicated by the computer. In this manner, the computer rejects the data caused by the extraneous golf ball launched by the interfering golfer. Additionally, the computer examines the amplitude of received signals, as was gathered at input 58 of the computer. If the amplitude does not exceed a threshold at some point during the acquisition process, the computer similarly rejects the data.

Alternative Embodiment: Multiple Sensors

The first, single-sensor embodiment of the invention described thus far successfully extracts the parameters of a struck golf ball. A second embodiment of the invention, using multiple speed sensors, generates more data for each struck golf ball. Consequently, the corresponding system of equations is more highly constrained, and the accuracy of the invention is improved. The multiple-sensor embodiment is shown in use in FIG. 16.

Figure 16:
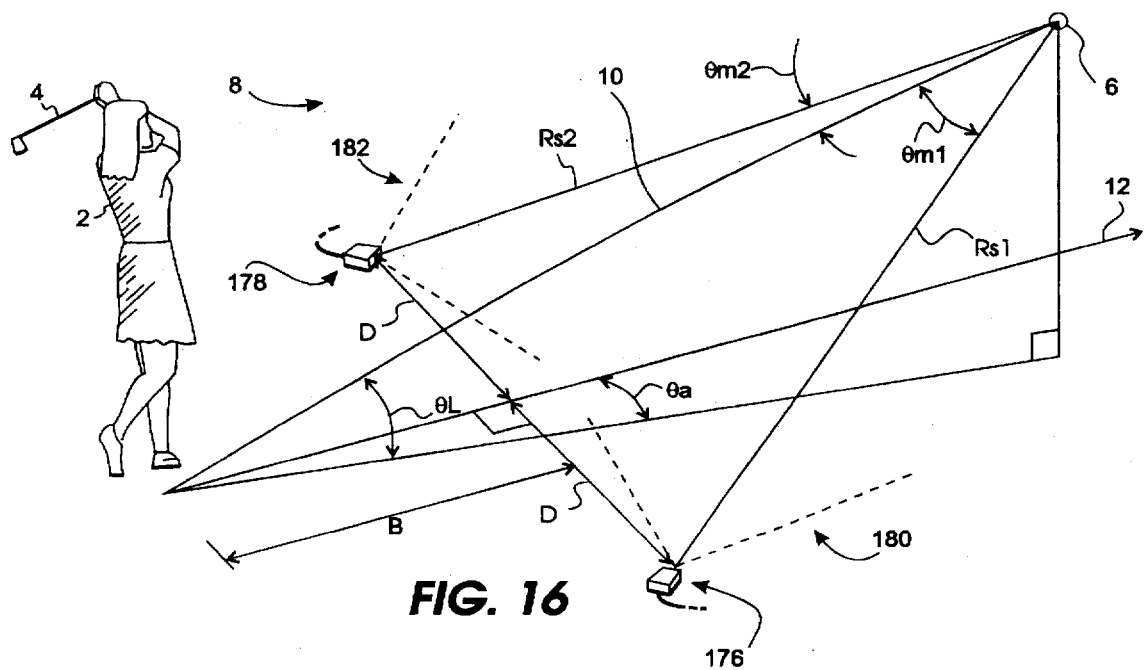
FIG. 16 is a perspective view of an alternative embodiment of the invention in use, featuring multiple speed sensors.

Referring to FIG. 16, a first speed sensor 176 and a second speed sensor 178 are each deployed a lateral distance D from straight aim line 12 of practice region 8. The circuitry of each speed sensor (176, 178) is similar to that of the preferred embodiment, as depicted in FIG. 4, except that there need be only one computer 60 to gather data from both speed sensors, and one microphone 72 and associated circuitry (74, 76, 78, 80) to detect club impacts. First 176 and second 178 speed sensors are preferably operated at widely different microwave frequencies, such as 24.150 and 10.525 GHz, respectively, so that they do not interfere with each other. Alternatively, first and second speed sensors operating at the same frequency may each be alternatively energized in rapid succession, thus avoiding interference.

Operation of the multiple-sensor embodiment is similar to that of the single-sensor embodiment. Golfer 2 strikes ball 6, which enters a wide beam of radiation 180 from the first speed sensor, and a second wide beam 182 of radiation from a second speed sensor. Radiation is reflected back to each of the sensors (176, 178), shifted in frequency by the Doppler effect. A radial Rs1 from the first sensor forms a first measurement angle $\theta m1$ with the trajectory 10, and a second radial Rs2 from the second sensors forms a second measurement angle $\theta m2$ with trajectory 10. Each speed sensor will measure the apparent speed of the ball with respect to each sensor, with the apparent speed being the true speed of the times the cosine of the respective measurement angle. The first and second measurement angles ($\theta m1$, $\theta m2$) are different from each other for all points along trajectory 10 of the ball, except for the case when the ball is aimed straight.

Figure 17:
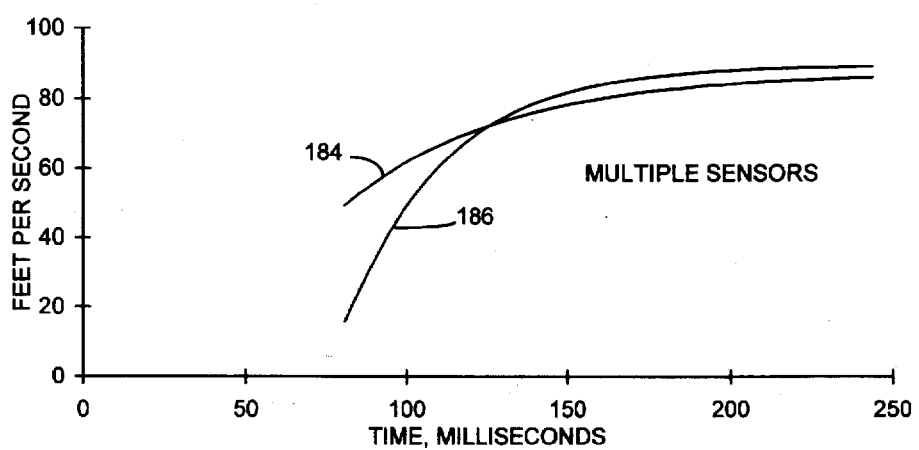
FIG. 17 illustrates the received apparent speed data from each of the sensors of the alternative embodiment.

So configured, when a ball is struck, the first and second speed sensors simultaneously produce first and second arrays of apparent speed data. For all cases except a ball aimed straight, the data represents different measurement angles for the same true ball speed, resulting in different apparent speed data. FIG. 17 graphs the first 184 and second 186 apparent speed data arrays for a ball struck with an initial speed of 100 fps, a loft angle of 20 degrees, and an aim angle of 20 degrees. The two curves are quite different. The impact time of the ball is sensed in a method similar to that of the first embodiment. Then, the computer executes a slightly modified version of the successive approximation parameter determination method disclosed in the first embodiment.

For the purposes of multiple sensor parameter determination, the trajectory prediction algorithm must be modified to generate predicted apparent speed data for two speed sensors. As with the first embodiment, the ball trajectory may be analyzed in a single x-y plane, as is illustrated in FIG. 7. Thus, block 90 of the trajectory prediction algorithm (FIG. 9) need not be modified. The determination of the measured speed (block 92 of FIG. 9) must be expanded to predict the speed of for the first and second sensors. This expansion amounts to a second set of equations which are very similar to those of block 92. The error function algorithm depicted in FIG. 10 must also be modified to reflect the inclusion of a first and second speed sensor. The error value (ERROR) must sum the absolute difference between the predicted apparent speed of the first sensor and the acquired speed data for the first sensor, as well as the absolute difference between the predicted and acquired speed data for the second sensor. The modification of each of these routines is straightforward and readily accomplished by one skilled in the arts of programming and kinematics, and thus are not illustrated here. The search algorithm of the first embodiment (FIG. 11) need not be modified for use with multiple sensors. The fact that the ERROR value is the result of more data improves the convergence characteristics, but the algorithm remains the same. As was the case with the first embodiment, the best guess of parameters from the search algorithm are communicated to a video display unit. Other aspects, such as the rejection of interfering golfers, are identical to those of the first embodiment.

The data are much more highly constrained in the multiple-sensor embodiment, and thus convergence of the successive approximation method is more rapid. The initial guess for aim angle may be zero, as was the case with the first embodiment. Alternatively, the microwave signal amplitude from each of the speed sensors may be used to make a closer initial guess of aim angle. As was the case with the first embodiment, the second embodiment is tolerant to missing data. If for any reason one of the sensors were to generate no data whatsoever for a struck ball, the search algorithm would still generate a solution based on data from the other sensor.

The multiple sensors produce data that more precisely defines the location of the ball, and thus the sensitivity of the solution to variations in several parameters is reduced. Specifically, the placement of the tee, while not exceedingly critical with a single speed sensor, is even less so with two. Also, the club impact detection does not affect the solution as strongly. Preferably, the sensors for a multi-transducer deployment are located a distance B into the practice area. This causes loft angle θL to more strongly affect the early portion of the acquired speed data, which facilitates more accurate determination of loft angle. Also, lateral distance D of the sensors to the straight aim line need not be as great for the multiple sensor embodiment of the invention.

Additional Alternative Embodiments

In addition to the methods described in the first and second embodiment of the invention, the invention may be implemented using other methods. For example, the prototype for the invention was implemented using a Phase Locked Loop. Alternatively, the apparent speed of the ball may be detected using a direct frequency counting method, or a period determination method. The speeds may be stored in computer memory directly in units of fps, or equivalently, as some values having a predetermined relationship to speed, such as scaled speed, reciprocals of speed, or a digitized waveform corresponding to speed. Also, the signal from the AGC amplifier may be digitized and the processed by a computer using Fast Fourier Transforms or some other Digital Signal Processing technique. Speed sensor 16 is preferably a microwave device, but a suitable radial speed sensor may also be constructed using ultrasonic waves or optical radiation.

The search algorithm which has been described may be made faster, although the parameters will be extracted with full accuracy with the methods which have been disclosed. For example, the order of the guesses may be optimized, using an order of varying parameters which quickly arrives at a solution. In the field of Artificial Intelligence this is known as making the guess generator informed. Conceptually, the search algorithm may be thought of as a curve-fitting technique. There exists a variety of such techniques, including the methods of least-squares, Newtonjan, and Levenberg-Marquardt. All of these techniques involve a method of successively better approximations. The method disclosed herein was selected for the invention because of its computational simplicity. Given the widespread availability of inexpensive and powerful computers, speed of the search algorithm is not critical. A computer up to the task of displaying three dimensional graphics is also well suited to executing the search algorithm of the invention.

In the aforementioned discussion, data gathering and parameter determination was performed by a single computer. A second computer deployed in a video unit performed the computations necessary for the golf simulation. In practice, these computers may be combined into one, or a third, and simpler, computer may be added to facilitate data acquisition. It does not matter in which computer the parameter determination methods of the invention are implemented. In the preferred embodiment of the invention, the trajectory and the resulting predicted apparent speed are computed anew for each guess of launch conditions. To speed the search algorithm, trajectories and apparent speeds may be computed in advance, possibly on a separate computer, and placed in the memory of a computer contained within the invention.

While acoustic club/ball impact detection is simple and inexpensive, other methods of impact detection would also be suitable. For example, optical beams may be used. In the embodiments thus far described, time of impact of the club was considered to be fixed, based on some detection means. Alternatively, impact time may be left as a variable. The search algorithm would then find an optimal value for impact time, just as it did for loft angle, aim angle, and initial speed. The additional data from impact detection contributes to the accuracy of the parameter determination, but it is not essential.

In each of the aforementioned embodiments, the placement of the tee was illustrated as being predetermined, but this need not be the case. For the first, single-sensor embodiment, it is possible to permit distance from the sensor to be a variable, but angular placement around a radius defined by that distance must be fixed. Thus, small movement of the tee along the straight aim line 12 of FIG. 1 impresses itself directly upon the aim angle solution. For example, a displacement from nominal of six inches yields an aim angle solution that is nominally inaccurate by about 5 degrees; this is a reasonable upper limit for a golf simulation game. Precise placement of the tee is less critical for the multiple-sensor embodiment. Distances from each sensor to the tee may be left as variables and permitted to assume values within some reasonable range. Optionally, three or more sensors may be deployed, resulting in an even more highly constrained solution.

The preferred method of parameter determination for the invention is one of successive approximation, as disclosed herein. It is plausible, but less desirable, to generate forward computational approaches to extract the launch parameters. For example the true speed of the ball may be extracted to a good approximation using the formula: SPEED=SPEED_APPARANT+1.07* SLOPE, where slope is the slope of the acquired apparent speed data, in units of fps per sample. Applying this formula to the acquired apparent speed array generates an array of approximate values of the true speed of the ball. Using the impact time data, the approximate initial speed of the ball may be extrapolated.

Continuing in the description of an alternative, forward computational approach, the slope of the approximate apparent speed data is compared against a lookup table to extract loft angle. Preferably, data from late in the flight of the ball is used. The lookup table is generated using the trajectory algorithm disclosed herein. In order to extract the aim of the ball, the apparent speed data is plotted as a function of percent slope verses distance. This distance is figured using the extracted approximate initial speed. Data from early in this curve may be used in a second lookup table, generated with the aid of the trajectory algorithm of FIG. 9, to generate the approximate aim angle. The virtue of the aforementioned forward-computed approach is that the computer within the device may be made very simple and inexpensive. While the approach relies on theoretical correlation, rather than empirical data, many approximations are made in this process. Thus, the approach is less accurate, and less desirable than the successive approximation method.

A further alternative embodiment would include some means of sensing the rate of spin of the ball, This would permit more accurate modeling of the flight of the ball over the entire trajectory. Ideally, the axis of spin could be determined, and the trajectory computations modified to accommodate the resulting aerodynamic forces on the ball. Alternatively, an amount of curvature as a function of aim angle may be assumed, based on the theoretical effects of aim angle on side spin.

Conclusions, Ramifications and Scope

The invention achieves the surprising result that by maximizing the measurement angle, which has heretofore been considered a source of error, it is possible to extract golf launch parameter information with greater accuracy than was previously possible. By using the methods taught herein, not only can the parameter determination process be made accurate for different aim angles, but the value of the aim angle may be extracted. The accuracy of the present parameter determination apparatus makes possible a realistic, and thus entertaining, golf simulation device.

Although the description above contains many specificities, these should not be construed as limiting the scope of the invention but as merely providing illustrations of some of the presently preferred embodiments of this invention. Also, while the present invention is believed to find particular application to the field of golf, it may be applied to other sports as well. The launch parameters of a tennis ball struck by a tennis racket, for example, may be extracted, either for the purpose of simulation or for analysis.

Thus the scope of the invention should be determined by the appended claims and their legal equivalents, rather than by the examples given.

What is claimed is:

1. An apparatus for determining at least one parameter regarding the motion of a projectile struck by a piece of sporting equipment, said apparatus comprising:
   a) a radial speed measuring device, wherein said radial speed measuring device measures a component of the true speed of said projectile subtending a radial from said radial speed measuring device to said projectile, whereby said component forms an apparent speed of said projectile;
   b) memory means for storing data;
   c) acquisition means, operatively coupled to said radial speed measuring device and to said memory means, for acquiring a plurality of apparent speeds of said projectile, wherein at least some of the plurality of apparent speeds differs substantially from the corresponding true speeds of said projectile; and
   d) computing means for determining the parameter, said computing means using at least some of the acquired plurality of apparent speeds differing substantially from the corresponding true speeds of said projectile to determine the parameter.

2. The apparatus of claim 1 wherein said radial speed measuring device comprises a microwave transceiver.

3. The apparatus of claim 2 wherein said microwave transceiver further comprises:
   a) radiation emitting means for emitting a beam of radiation, wherein said beam of radiation is wide, thereby facilitating the acquisition a plurality of apparent speeds differing substantially from the corresponding true speeds of said projectile; and
   b) radiation receiving means.

4. The apparatus of claim 3 further comprising a signal level sensing means operatively coupled to said radiation receiving means.

5. The apparatus of claim 2 wherein the projectile comprises a golf ball, and the piece of sporting equipment comprises a golf club.

6. The apparatus of claim 5 further comprising a second radial speed measuring device, said second radial speed measuring device comprising a microwave transceiver.

7. The apparatus of claim 5 wherein the parameter is selected from the group consisting of the aim angle of the struck golf ball, the loft angle of the struck golf ball, and the initial speed of the struck golf ball.

8. The apparatus of claim 5 further comprising;
   a) impact detecting means for detecting an impact of the club on the ball;
   b) window determining means for determining a window of time within which the impact of the club on the ball is plausible, said window determining means using at least some of the acquired plurality of apparent speeds differing substantially from the corresponding true speeds of said projectile to determine the window; and
   c) means for ascertaining whether the impact of the club on the ball occurred within said window of time.

9. The apparatus of claim 5 wherein the computing means comprises a successive approximation means.

10. The apparatus of claim 9, wherein said successive approximation means comprises:
    a) trajectory prediction means for predicting a predicted plurality of apparent speeds which would arise from an estimated set of launch parameters; and
    b) solution finding means which utilizes said trajectory prediction means to determine a set of estimated launch parameters which best accounts for the acquired plurality of apparent speeds.

11. The apparatus of claim 10, wherein said solution finding means comprises:
    a) an error function means for generating an error value indicative of how well said predicted plurality of speeds matches the acquired apparent speeds; and b) search algorithm means which uses said error function means for selecting progressively better estimates of launch parameters.

12. The apparatus of claim 11, further comprising a threshold sensing means for determining whether said error value exceeds a predetermined threshold.

13. An apparatus for determining at least one parameter regarding the motion of a projectile struck by a piece of sporting equipment into a practice region, said practice region having a straight aim line, said apparatus comprising:

a) a radial speed measuring device, deployed a substantial lateral distance from said straight aim line or an extension thereof, wherein said radial speed measuring device measures a component of the true speed of said projectile subtending a radial from said radial speed measuring device to said projectile, whereby said component forms an apparent speed of said projectile;

b) memory means for storing data;

c) acquisition means, operatively coupled to said radial speed measuring device and to said memory means for storing dam, for acquiring a plurality of apparent speeds of said projectile; and d) computing means for determining said parameter regarding the motion of said projectile, said computing means using at least some of the acquired plurality of apparent speeds.

14. The apparatus of claim 13 wherein said radial speed measuring device comprises a microwave transceiver.

15. The apparatus of claim 14 wherein the projectile comprises a golf ball, and the piece of sporting equipment comprises a golf club.

16. The apparatus of claim 15 further comprising a tee-off location which is substantially predetermined with respect to the location of said radial speed sensing device.

17. The apparatus of claim 16 wherein said radial speed measuring device is located at least four feet from the straight aim line of the golf ball or an extension thereof.

18. The apparatus of claim 15 wherein the parameter is selected from the group consisting of the aim angle of the struck golf ball, the loft angle of the struck golf ball, and the initial speed of the struck golf ball.

19. The apparatus of claim 15 further comprising a second radial speed measuring device, said second radial speed measuring device comprising a microwave transceiver.

20. The apparatus of claim 15 wherein the computing means comprises a successive approximation means.

21. The apparatus of claim 20, wherein said successive approximation means comprises:

a) trajectory prediction means for predicting a predicted plurality of apparent speeds which would arise from an estimated set of launch parameters; and b) solution finding means which utilizes said trajectory prediction means to determine a set of estimated launch parameters which best accounts for the acquired plurality of apparent speeds.

22. The apparatus of claim 21, wherein said solution finding means comprises:

a) an error function means for generating an error value indicative of how well said predicted plurality of speeds matches the acquired apparent speeds; and b) search algorithm means which uses said error function means for selecting progressively better estimates of launch parameters.

23. The apparatus of claim 22, further comprising a threshold sensing means for determining whether said error value exceeds a predetermined threshold.

24. An apparatus for determining at least one parameter regarding the motion of a projectile smack by a piece of sporting equipment, said apparatus comprising:

a) a radial speed measuring device, wherein said radial speed measuring device measures a component of the true speed of said projectile subtending a radial from said radial speed measuring device to said projectile, whereby said component forms an apparent speed of said projectile;

b) memory means for storing data;

c) acquisition means, operatively coupled to said speed measuring device and to said memory means, for acquiring a plurality of apparent speeds of said projectile; and d) computing means for determining said parameter regarding the motion of said projectile, said computing means using at least some of the acquired plurality of apparent speeds, said computing means comprising a successive approximation means.

25. The apparatus of claim 24 wherein said radial speed measuring device comprises a microwave transceiver.

26. The apparatus of claim 25 wherein said projectile comprises a golf ball, and said piece of sporting equipment comprises a golf club.

27. The apparatus of claim 26 further comprising a second radial speed measuring device, said second radial speed measuring device comprising a microwave transceiver.

28. The apparatus of claim 27 wherein the parameter is selected from the group consisting of the aim angle of the struck golf ball, the loft angle of the struck golf ball, and the initial speed of the struck golf ball.

29. The apparatus of claim 28, wherein said successive approximation means comprises:

a) trajectory prediction means for predicting a predicted plurality of apparent speeds which would arise from an estimated set of launch parameters; and b) solution finding means which utilizes said trajectory prediction means to determine a set of estimated launch parameters which best accounts for the acquired plurality of apparent speeds.

30. The apparatus of claim 29, wherein said solution finding means comprises:

a) an error function means for generating an error value indicative of how well said predicted plurality of speeds matches the acquired apparent speeds; and b) search algorithm means which uses .said error function means for selecting progressively better estimates of launch parameters.

31. The apparatus of claim 30, further comprising a threshold sensing means for determining whether said error value exceeds a predetermined threshold.

* * * * *

UNITED STATES PATENT AND TRADEMARK OFFICE
CERTIFICATE OF CORRECTION

PATENT NO. : 5,700,204
DATED : Dec. 23, 1997
INVENTOR(S) : Rein Teder

It is certified that error appears in the above-identified patent and that said Letters Patent is hereby corrected as shown below:

Col. 2, l. 40, change "hue" to --true--.

Col. 2, l. 42, change "hue" to --true--.

Col. 2, l. 51, change "shuck" to --struck--.

Col. 2, l. 56, change "at." to --al.--.

Col. 3, l. 40, change "at." to --al.--.

Col. 3, l. 62, change "the extracting"

to --extracting the--.

Col. 8, l. 34, change "hue" to --true--.

Col. 8, l. 40, change "Om" to --$\theta$m--.

Col. 8, l. 52, change "Om" to --$\theta$m--.

Col. 8, l. 56, change "hue" to --true--.

UNITED STATES PATENT AND TRADEMARK OFFICE
CERTIFICATE OF CORRECTION

PATENT NO. : 5,700,204
DATED : Dec. 23, 1997
INVENTOR(S) : Rein Teder

It is certified that error appears in the above-identified patent and that said Letters Patent is hereby corrected as shown below:

Col. 12, l. 26, change "dram" to --drawn--.

Col. 13, l. 24, change "at." to --al.--.

Col. 14, l. 36, change "dam" to --data--.

Col. 18, l. 22, change "varies" to --varied--.

Col. 19, l. 8, change "toe-off" to --tee-off--.

Col. 22, l. 11, change "Newtonjan" to --Newtonian--.

Col. 25, l. 21, change "dam" to --data--.

Col. 26, l. 8, change "smack" to --struck--.

Col. 26, l. 54 change ".said" to --said--.

Signed and Sealed this

Fourteenth Day of March, 2000

Attest:

Attesting Officer

Q. TODD DICKINSON

Commissioner of Patents and Trademarks